(12) United States Patent
Monden et al.

(10) Patent No.: US 6,783,703 B2
(45) Date of Patent: Aug. 31, 2004

(54) SOLID ELECTROLYTIC CAPACITOR AND METHOD FOR PRODUCING THE SAME

(75) Inventors: Ryuji Monden, Nagano (JP); Katsuhiko Yamazaki, Nagano (JP); Atsushi Sakai, Nagano (JP); Yuji Furuta, Nagano (JP); Hideki Ohata, Chiba (JP); Koro Shirane, Chiba (JP); Hiroshi Konuma, Saitama (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 217 days.

(21) Appl. No.: 10/053,672

(22) Filed: Jan. 24, 2002

(65) Prior Publication Data

US 2002/0105777 A1 Aug. 8, 2002

Related U.S. Application Data

(62) Division of application No. 09/576,263, filed on May 24, 2000, now Pat. No. 6,381,121.
(60) Provisional application No. 60/135,846, filed on May 24, 1999, provisional application No. 60/144,817, filed on Jul. 21, 1999, and provisional application No. 60/162,235, filed on Oct. 29, 1999.

(30) Foreign Application Priority Data

Jul. 9, 1999 (JP) ............................................. 11-195702
Oct. 8, 1999 (JP) ............................................. 11-288660

(51) Int. Cl.⁷ ............................................... H01B 1/24
(52) U.S. Cl. ....................................................... 252/511
(58) Field of Search ................................. 252/510, 511

(56) References Cited

U.S. PATENT DOCUMENTS 3,581,159 A      5/1971  Piper
5,256,463 A  *  10/1993  Osaka et al. .................. 428/77
6,447,950 B1 *   9/2002  Iijima .......................... 429/209

FOREIGN PATENT DOCUMENTS

| EP | 559 109 | 9/1993 |
|---|---|---|
| EP | 820 076 | 1/1998 |
| JP | 61-69853 | 4/1986 |
| JP | 61-240625 | 10/1986 |
| JP | 62-118511 | 5/1987 |
| JP | 64-67904 | 3/1989 |
| JP | 64-69662 | 3/1989 |
| JP | 61-239617 | 10/1989 |
| JP | 2-5304 | 1/1990 |
| JP | 4-177802 | 6/1992 |
| JP | 4-181607 | 6/1992 |
| JP | 5-3138 | 1/1993 |
| JP | 5-7078 | 1/1993 |
| JP | 5-152171 | 6/1993 |
| JP | 5-175082 | 7/1993 |
| JP | 7-233298 | 9/1995 |
| JP | 7-262822 | 10/1995 |
| JP | 9-31402 | 2/1997 |
| WO | WO99/50918 | * 10/1999 |

* cited by examiner

*Primary Examiner*—Mark Kopec
(74) *Attorney, Agent, or Firm*—Sughrue Mion, PLLC

(57) ABSTRACT

The present invention relates to a solid electrolytic capacitor comprising a solid electrolyte layer and an electrically conducting layer comprising metallic powder or an electrically conducting layer comprising an electrically conducting carbon layer and a layer formed thereon and comprising metallic powder in which at least one of said layers contains a rubber-like elastic material; a production process thereof; a solid electrolyte for use in the solid electrolytic capacitor; a production process of the solid electrolyte; an electrically conducting paste for use in the solid electrolytic capacitor; and an electrically carbon conducting paste for use in the solid electrolytic capacitor. The solid electrolytic capacitor of the present invention can be made compact and can be endowed with high-capacitance and low-impedance and is excellent in external force-relaxing properties, productivity, heat resistance and moisture resistance, etc.

5 Claims, 3 Drawing Sheets

SOLID ELECTROLYTIC CAPACITOR AND METHOD FOR PRODUCING THE SAME

CROSS REFERENCE TO RELATED APPLICATIONS

This is a divisional of application Ser. No. 09/576,263 filed May 24, 2000 now U.S. Pat. No. 6,381,121 which is an application filed under 35 U.S.C. §111(a) claiming benefit pursuant to 35 U.S.C. §119(e)(1) of the filing dates of Provisional Application No. 60/135,846 filed May 24, 1999, Provisional Application No. 60/144,817 filed Jul. 21, 1999, and Provisional Application No. 60/162,235 filed Oct. 29, 1999 pursuant to 35 U.S.C. §111(b); the above noted prior applications are all hereby incorporated by reference.

TECHNICAL FIELD TO WHICH THE INVENTION BELONGS

The present invention relates to a solid electrolytic capacitor comprising a solid electrolyte layer and an electrically conducting layer (an electrically conducting layer comprising metallic powder or an electrically conducting layer comprising an electrically conducting carbon layer and a layer formed thereon and comprising metallic powder) in which at least one of said layers contains a rubber-like elastic material and a production process thereof. More specifically, the present invention relates to a solid electrolytic capacitor which can be made compact and can be endowed with high-capacitance and low-impedance and is excellent in external force-relaxing properties, productivity, heat resistance and moisture resistance, etc., and a production process thereof.

The present invention also relates to a solid electrolyte, a conducting paste comprising metallic powder and an electrically conducting carbon paste for use in a solid electrolytic capacitor.

BACKGROUND ART

In general, a solid electrolytic capacitor is formed through the following steps: a dielectric oxide film layer is formed on a positive electrode substrate formed of a metallic foil which undergoes etching treatment and has a large specific surface area; a solid semiconducting layer (hereinafter referred to as "solid electrolyte layers") serving as a counter electrode is formed outside the oxide film layer; preferably a conducting layer comprising metallic powder or a conducting layer comprising a conductive carbon layer and a layer formed thereon comprising metallic powder is further formed on the outer side of the solid electrolyte layer; and a lead wire is connected thereto, thereby forming the basic elements of a capacitor. Subsequently, the entirety of the elements is completely sealed by use of an epoxy resin or the like. The thus-obtained product is widely used as a capacitor component in electric appliances.

In recent years, in order to meet requirements for digitization of electric apparatuses and increase in processing speed of personal computers, solid electrolytic capacitors are demanded to have small size, high capacitance, and low impedance in a high-frequency range.

In order to meet demands for such solid electrolytic capacitors, suggestions have been made with regard to solid electrolytes, conducting materials, etc.

For the solid electrolyte, it is heretofore known to use, for example, an inorganic semiconductor material such as manganese dioxide and lead dioxide, an organic semiconductor material such as TCNQ complex salt, an intrinsic electrically conducting polymer having an electric conductivity of from $10^{-3}$ to $5 \times 10^3$ S/cm (JP-A-1-169914 (the term "JP-A" as used herein means an "unexamined published Japanese patent application") corresponding to U.S. Pat. No. 4,803,596) or an electrically conducting polymer such as π-conjugated polyaniline (JP-A-61-239617), polypyrrole (JP-A-61-240625), polythiophene derivative (JP-A-2-15611, U.S. Pat. No. 4,910,645) or polyisothianaphthene (JP-A-62-118511).

Capacitors using manganese dioxide for the solid electrolyte are disadvantageous not only in that when manganese nitrate is thermally decomposed to form manganese dioxide, the oxide dielectric film once formed on the anode foil is ruptured, but also in that the impedance property is not satisfied.

In the case of using lead dioxide, cares on the environment are additionally required.

Capacitors using a TCNQ complex salt solid for the solid electrolyte have good heat molten workability and excellent electric conductivity but are considered to show poor reliability in the heat resistance at the solder joining (soldering heat resistance) because the TCNQ complex salt itself has a problem in the heat resistance.

Capacitors using an electrically conducting polymer for the solid electrolyte are free of rupture of dielectric film and favored with high impedance property but disadvantageously deficient in the heat resistance, thermal shock resistance and vibration resistance.

With respect to the method for forming a solid electrolyte using an electrically conducting polymer, for example, a method of melting an electrically conducting polymer (solid electrolyte) as described above on a dielectric film layer on the surface of a valve-acting metal having fine void structures to form an electrically conducting polymer layer, and a method of depositing the above-described electrically conducting polymer on the dielectric film layer are known.

More specifically, in the case of using, for example, a polymer of a 5-membered heterocyclic compound such as pyrrole or thiophene for the solid electrolyte, there are known a method of forming an electrically conducting polymer layer having a necessary thickness by repeating a series of operations of dipping an anode foil having formed thereon a dielectric film in a lower alcohol and/or water-based solution of a 5-membered heterocyclic compound monomer and after pulling it up, again dipping the foil in an aqueous solution having dissolved therein an oxidizing agent and an electrolyte to cause chemical polymerization of the monomer (JP-A-5-175082), a method of coating simultaneously or not simultaneously a 3,4-ethylenedioxythiophene monomer and an oxidizing agent each preferably in the form of a solution on the oxide film layer of a metal foil to form an electrically conducting polymer layer (JP-A-2-15611 (U.S. Pat. No. 4,910,645) and JP-A-10-32145 (European Patent Laid-Open Publication 820076)), and the like.

As the oxidizing agent for use in conventional techniques, for example, chemical polymerization of 5-membered heterocyclic compounds such as thiophene, there are known iron (III) chloride, $Fe(ClO_4)_3$, organic acid iron (III) salt, inorganic acid iron (III) salt, alkyl persulfate, ammonium persulfate (hereinafter simply referred to as "APS"), hydrogen peroxide, $K_2Cr_2O_7$, etc., (JP-A-2-15611), cupric compounds, silver compounds, etc., (JP-A-10-32145 (European Patent Laid-Open Publication 820076)).

In recent years, a method for producing a polyaniline composite is proposed, where powdered polyaniline is used as an electrically conducting starting material, rubber and/or thermoplastic resin is used as the matrix material and the powdered polyaniline is dispersed and compounded in the rubber and/or thermoplastic resin to form a polyaniline composite having mechanical strength and flexibility (JP-A-64-69662).

Furthermore, a method for producing a capacitor is proposed, where a composite film is formed on the metal oxide of a capacitor electrode from a polyaniline solution containing from 1 to 25 mass % of a polymer binder and an electrically conducting polymer layer comprising polyaniline having added thereto anion is further formed on the composite film (JP-A-5-3138).

According to the above-descried methods, it is necessary for forming an electrically conducting polymer layer to previously form a thin electrically conducting layer on the oxide film as an insulator by chemical polymerization. Furthermore, there are problems mentioned below in suitability applying these methods to respective capacitors.

First, in the case of electrolytic polymerization, if the polymer has poor flexibility, the increase in viscosity causes reduction in capacitance. More specifically, when an aluminum foil having formed thereon a dielectric material obtained by etching the surface is dipped with an oxidizing agent solution and then dried, an oxide film having high viscosity is formed on the surface of a porous body. As a result, microfine pore openings present on the surface of the porous body are clogged. Furthermore, a polymer is formed on the surface by the contact with a monomer and the polymer is not formed inside the pores, which causes reduction in capacitance.

Second, in the case of chemical polymerization, the amount of polymer adhered by one polymerization step is small, accordingly, the dipping must be repeated with predetermined number of steps. Thus, a method advantageous in view of productivity is demanded.

Third, close contact or good adhesive property between the dielectric film and the solid electrolyte is required. If the adhesive property is poor, the product deteriorates or the uniformity is lost in the production, as a result, the production yield decreases or the durability in use has a problem.

In order to solve these problems, the electrically conducting polymer such as polypyrrole is electrolytically or chemically polymerized and the polymer obtained is used for the solid electrolyte of a solid electrolytic capacitor in the above-described methods. However, capacitors obtained are not satisfied in the uniformity of the electrically conducting polymer layer and properties as an electrolytic capacitor such as soldering heat resistance and impedance properties are not satisfactory.

For the electrical conducting layer used to join the cathode lead terminal and the solid electrolyte layer, an electrically conducting paste comprising an electrically conducting filler and a synthetic resin binder is usually used. A metal powder such as gold, silver, copper, etc., and carbon powder are generally used for an electrically conducting filler. The synthetic resin usually used includes epoxy resin, phenol resin and the like. Besides these resins, polyamide or polyimide resin, fluororesin (JP-A-5-152171) and acrylic resin (JP-A-7-233298) are also known.

Conducting carbon pastes have been used as die-bonding materials serving as adhesives between a silicon chip and a lead frame, or in a conducting paste layer of a solid electrolytic capacitor. In addition, a conducting paste containing a fluorine-containing polymer serving as a binder resin is also proposed (JP-A-2-5304). Such conducting pastes for die-bonding are demanded to have high conductivity, high heat resistance, low contraction stress generated during die bonding, and low water absorption ratio after die bonding. In addition, during heating conjunction, the paste must have ability to reduce stress generated between a silicon chip and a lead frame.

However, silver pastes using a common synthetic resin for the binder are high in the modulus of elasticity and a high stress is often generated by the reflow and the like, which causes increase in the leakage current or heat deterioration of the impedance due to separation at the paste interface. Furthermore, this kind of paste has high water absorption, accordingly, the performance thereof is liable to deteriorate in high temperature and high humidity conditions.

Some silver pastes use fluororesin as the binder but these pastes have also high modulus of elasticity and a high stress is generated by the reflow or the like to cause defect.

Silver, which is excellent in cost and performance, is widely used as a conducting material. However, due to unfavorable migration phenomenon of silver, when used as a paste of a solid electrolytic capacitor, a conducting silver paste is often used only after an electrically conducting carbon paste is applied.

There are many proposals regarding a conducting material, a binder, and a solvent used in an electrically conducting carbon paste. For example, JP-A-9-31402 discloses combination of natural graphite (flake graphite having a size of 10–20 $\mu$m) and carbon black, serving as a conducting material. JP-A-5-7078 discloses a carbon powder having projections and serving as a conducting material. JP-A-4-181607 discloses the combination of carbon black having a size of 20 $\mu$m or less and a synthetic resin, serving as a combination of a conducting material and a binder. JP-A-7-262822 discloses the combination of a flake graphite powder and a micro-graphite powder (aspect ratio: 10 or more, average particle size: 10 $\mu$m or less) and an epoxy resin, serving as a combination of a conducting material and a binder. JP-A-61-69853 discloses the combination of graphite and a fluorine-containing polymer (e.g., PTFE micro-particles), serving as a combination of a conducting material and a binder. JP-A-4-177802 discloses the combination of a carbon powder and a glycidyl ether, serving as a combination of a conducting material and a solvent. Furthermore, a number of synthetic resins serving as a binder, such as polyethylene, epoxy resins, and phenolic resins, are proposed.

However, an electrically conducting carbon paste produced from natural graphite has a disadvantage of low conductivity, since natural graphite has flake form and therefore attains poor packing, and contains a large amount of impurities. In addition, when the paste of this type is applied, peeling of the paste tends to occur at the interface thereof since the surface thereof has low irregularity, and the paste has a problem that the heat deterioration of impedance tends to occur.

Meanwhile, an electrically conducting carbon paste produced from carbon black contains very small particles, and thus enhanced packing cannot be obtained and conductivity of the paste is difficult to increase in the same way as the paste produced from natural graphite. These natural graphite-type and carbon black-type conducting carbon pastes must be subjected to dispersion treatment during paste preparation.

Employment of an epoxy resin serving as a binder provides some advantages, including low cost and easy handling. However, the epoxy resin has some drawbacks, including high rigidity, and low capacity of relaxation in response to reduction of stress generated between a chip and a lead frame during heating treatment such as reflow soldering in accordance with increase in chip size. In addition, the resin has high water-absorption ability, and thus deterioration of moisture resistance tends to occur.

SUMMARY OF THE INVENTION

The present invention relates to a solid electrolytic capacitor comprising a solid electrolyte layer, an electrically conducting layer comprising metallic powder and an electrically conducting carbon layer which is optionally formed between the solid electrolyte layer and the layer comprising metallic powder, in which at least one of said layers contains a rubber-like elastic material; a production process thereof; and solid electrolyte, an electrically conducting paste comprising metallic powder and an electrically conducting carbon paste, each of which will be described in detail below.

1) A solid electrolytic capacitor comprising a valve-acting metal having a dielectric film layer formed on the surface thereof, a solid electrolyte layer and an electrically conducting layer which are formed on the dielectric film layer, wherein at least one of said solid electrolyte layer and electrically conducting layer contains a rubber-like elastic material.
2) The solid electrolytic capacitor as described in the above 1), wherein the electrically conducting layer is an electrically conducting layer containing metallic powder or an electrically conducting layer comprising an electrically conducting carbon layer and a layer containing metallic powder formed on the conducting carbon layer.
3) The solid electrolytic capacitor as described in the above 1) or 2), wherein the rubber-like elastic material is contained in the solid electrolyte layer.
4) The solid electrolytic capacitor as described in the above 2), wherein the rubber-like elastic material is contained in the conducting carbon layer.
5) The solid electrolytic capacitor as described in the above 2), wherein the rubber-like elastic material is contained in the electrically conducting layer containing metallic powder.
6) The solid electrolytic capacitor as described in the above 2), wherein the rubber-like elastic material is contained in the solid electrolyte layer and the electrically conducting carbon layer.
7) The solid electrolytic capacitor as described in the above 2), wherein the rubber-like elastic material is contained in the solid electrolyte layer and the electrically conducting layer containing metallic powder.
8) The solid electrolytic capacitor as described in the above 2), wherein the rubber-like elastic material is contained in the electrically conducting carbon layer and the electrically conducting layer containing metallic powder.
9) The solid electrolytic capacitor as described in the above 2), wherein the rubber-like elastic material is contained in all of the solid electrolyte layer, the electrically conducting carbon layer and the electrically conducting layer containing metallic powder.
10) The solid electrolytic capacitor as described in any one of the above 1) to 9), wherein the solid electrolyte layer has a film-like or lamellar structure.
11) The solid electrolytic capacitor as described in the above 1), 3), 6), 7) or 9), wherein the solid electrolyte layer is formed of an electrically conducting polymer composition in the form of a film-like or lamellar structure containing from 0.01 to 25 mass % of a rubber-like elastic material.
12) The solid electrolytic capacitor as described in the above 11), wherein the rubber-like elastic material is at least one of natural rubbers and synthetic elastomers.
13) The solid electrolytic capacitor as described in the above 11) or 12), wherein the rubber-like elastic material is fluororubber.
14) The solid electrolytic capacitor as described in the above 11), wherein the electrically conducting polymer is a polymer containing at least one repeating unit of a divalent group selected from pyrrole, thiophene, aniline and derivatives thereof.
15) The solid electrolytic capacitor as described in the above 2), 5), 7), 8) or 9), wherein the electrically conducting layer containing metallic powder comprises an electrically conducting filler containing metal powder and a binder mainly comprising fluororubber.
16) The solid electrolytic capacitor as described in the above 15), wherein 80 mass % or more of the binder is fluororubber.
17) The solid electrolytic capacitor as described in the above 15), wherein 80 mass % or more of the electrically conducting filler is silver powder.
18) The solid electrolytic capacitor as described in the above 15) or 17), wherein the electrically conducting filler has an average particle size of from 1 to 10 $\mu$m.
19) The solid electrolytic capacitor as described in the above 15), 17) or 18), wherein the electrically conducting filler content is from 50 to 95 mass % and the binder content is from 5 to 50 mass %.
20) The solid electrolytic capacitor as described in the above 15), wherein the electrically conducting layer containing metallic powder is formed of an electrically conducting paste comprising an electrically conducting filler, a binder and an organic solvent.
21) A solid electrolytic capacitor obtained by sealing a capacitor device comprising a valve-acting metal anode having formed on the surface thereof a dielectric film, a solid electrolyte layer and an electrically conducting layer, with an insulating resin exclusive of the exposed areas of the anode lead terminal and the cathode lead terminal, wherein the solid electrolyte layer is an electrically conducting polymer layer and the electrically conducting layer is formed of an electrically conducting layer containing metallic powder described in the above 15) or 20).
22) The solid electrolytic capacitor as described in the above 21), wherein the electrically conducting layer comprises an electrically conducting carbon layer formed on the electrically conducting polymer layer and an electrically conducting layer containing metallic powder described in any one of the above 15) to 20), which is formed on the conducting carbon layer.
23) The solid electrolytic capacitor as described in the above 21) or 22), wherein the electrically conducting polymer layer is formed of poly (3,4-ethylene-dioxythiophene).
24) The solid electrolytic capacitor as described in the above 2), 4), 6), 8), 9) or 22), wherein the electrically conducting carbon layer is formed of an electrically conducting carbon paste predominantly comprising a conducting material, a binder and a solvent, and the conducting material contains artificial graphite in an amount of 80 mass % or more, and the artificial graphite has a fixed carbon content of 97 mass % or more, has an average particle size of 1–13 $\mu$m, an aspect ratio of 10 or less, and contains particles having a particle size of 32 $\mu$m or more in an amount of 12 mass % or less.
25) The solid electrolytic capacitor as described in the above 24), wherein the binder is a material of rubber-like elasticity which is swellable or suspendable in a solvent.

26) The solid electrolytic capacitor as described in the above 25), wherein the material of rubber-like elasticity which is swellable or suspendable in a solvent is at least one species selected from the group consisting of isoprene rubber, butadiene rubber, styrene/butadiene rubber, nitrile rubber, butyl rubber, an ethylene/propylene copolymer, acrylate rubber, polysulfide rubber, a fluoropolymer, silicone rubber, and a thermoplastic elastomer.

27) The solid electrolytic capacitor as described in the above 24), wherein the conducting material accounts for 30–99 mass % and the binder accounts for 1–70 mass % of the entire solid content of the conducting carbon paste.

28) A process for producing a solid electrolytic capacitor comprising steps of forming a solid electrolyte layer and an electrically conducting layer on a dielectric film layer which has been formed on the surface of a valve-acting metal, which comprises covering the valve-acting metal having formed on the surface thereof a dielectric film with a solution containing a monomer of an electrically conducting polymer and a solution containing an oxidizing agent one after the other once or a plurality of times to form an electrically conducting polymer composition film on the dielectric film, a rubber-like elastic material being contained in at least one of the monomer-containing solution and the oxidizing agent-containing solution.

29) The process for producing a solid electrolytic capacitor as described in the above 28), wherein the electrically conducting polymer composition contains from 0.01 to 25 mass % of a rubber-like elastic material.

30) The process for producing a solid electrolytic capacitor as described in the above 28) or 29), wherein the rubber-like elastic material is fluororubber.

31) A process for producing a solid electrolytic capacitor comprising steps of forming a solid electrolyte layer and an electrically conducting layer on a dielectric film layer which has been formed on the surface of a valve-acting metal, wherein the electrically conducting layer is formed on the solid electrolyte by using an electrically conducting paste comprising an electrically conducting material, a binder of rubber-like elasticity and a solvent.

32) The process for producing a solid electrolytic capacitor as described in the above 31), wherein the electrically conducting layer is a layer formed by using an electrically conducting paste comprising an electrically conducting material consisting of metallic powder, a binder of rubber-like elasticity and a solvent.

33) The process for producing a solid electrolytic capacitor as described in the above 31), wherein the step of forming electrically conducting layer comprises forming an electrically conducting carbon layer by using an electrically conducting carbon paste comprising a conducting material, a binder of rubber-like elasticity and a solvent, and then forming an electrically conducting layer containing metallic powder.

34) The process for producing a solid electrolytic capacitor as described in the above 31), wherein the step of forming an electrically conducting layer comprises forming an electrically conducting carbon layer by using an electrically conducting carbon paste comprising a conducting material, a binder of rubber-like elasticity and a solvent, and then forming a film of an electrically conducting layer containing metallic powder by using an electrically conducting paste comprising a conducting material consisting of metallic powder, a binder of rubber-like elasticity and a solvent.

35) The process for producing a solid electrolytic capacitor as described in any one of the above 31) to 34), wherein the step of forming solid electrolyte layer comprises covering the dielectric film with a solution containing a monomer of an electrically conducting polymer and a solution containing an oxidizing agent one after the other once or a plurality of times to form an electrically conducting polymer composition, a rubber-like elastic material being contained in at least one of the monomer-containing solution and the oxidizing agent-containing solution.

36) The process for producing a solid electrolytic capacitor as described in any one of the above 31) to 35), wherein the solid electrolyte layer has a film-like or lamellar structure.

37) The process for producing a solid electrolytic capacitor as described in the above 36), wherein the thickness of the film or each of the layers in the lamellar structure of the solid electrolyte falls within a range of approximately 0.1 $\mu$m to 0.3 $\mu$m.

38) A solid electrolyte formed from an electrically conducting polymer composition containing from 0.01 to 25 mass % of a rubber-like elastic material into a film-like or lamellar structure.

39) The solid electrolyte as described in the above 38), wherein the rubber-like elastic material is at least one of natural rubbers and synthetic elastomers.

40) The solid electrolyte as described in the above 38) or 39), wherein the rubber-like elastic material is fluororubber.

41) The solid electrolyte as described in the above 38), wherein the electrically conducting polymer is a polymer containing at least one repeating unit of a divalent group selected from pyrrole, thiophene, aniline and derivatives thereof.

42) A process for producing an article having a solid electrolyte formed of an electrically conducting polymer composition in the form of a film-like or lamellar structure, which comprises coating an article to be provided with solid electrolyte formed of an electrically conducting polymer composition on the surface thereof with a solution containing a monomer of an electrically conducting polymer and a solution containing an oxidizing agent one after the other once or a plurality of times to form an electrically conducting polymer composition film, a rubber-like elastic material being contained in at least one of the monomer-containing solution and the oxidizing agent-containing solution.

43) The process for producing an article having a solid electrolyte as described in the above 42), wherein coating is effected by dipping, applying, spraying or spreading.

44) The process for producing an article having a solid electrolyte as described in the above 42), wherein the rubber-like elastic material is added to the monomer-containing solution and/or the oxidizing agent-containing solution in the form of solution or dispersion.

45) An electrically conducting paste for solid electrolytic capacitors comprising an electrically conducting filler containing metal powder and a binder mainly comprising fluororubber.

46) The electrically conducting paste as described in the above 45), wherein 80 mass % or more of the binder is fluororubber.

47) The electrically conducting paste as described in the above 45), wherein 80 mass % or more of the electrically conducting filler is silver powder.

48) The electrically conducting paste as described in the above 45) or 47), wherein the electrically conducting filler has an average particle size of from 1 to 10 $\mu$m.

49) The electrically conducting paste as described in any one of the above 45), 47) or 48), wherein the electrically conducting filler content is from 50 to 95 mass % and the binder content is from 5 to 50 mass %.

50) The electrically conducting paste as described in any one of the above 45) to 49), which contains an organic solvent.

51) An electrically conducting carbon paste for solid electrolytic capacitors predominantly comprising an electrically conducting carbon material, a binder, and a solvent, wherein the electrically conducting carbon material contains artificial graphite in an amount of 80 mass % or more, and the artificial graphite has a fixed carbon content of 97 mass % or more, has an average particle size of 1–13 μm, an aspect ratio of 10 or less, and contains particles having a particle size of 32 μm or more in an amount of 12 mass % or less.

52) The electrically conducting carbon paste for solid electrolytic capacitors as described in the above 51), wherein the binder is a material of rubber-like elasticity which is swellable or suspendable in a solvent.

53) The electrically conducting carbon paste for solid electrolytic capacitors as described in the above 52), wherein the material of rubber-like elasticity is at least one species selected from the group consisting of isoprene rubber, butadiene rubber, styrene/butadiene rubber, nitrile rubber, butyl rubber, an ethylene/propylene copolymer, acrylate rubber, polysulfide rubber, a fluoropolymer, silicone rubber, and a thermoplastic elastomer.

54) The electrically conducting carbon paste for solid electrolytic capacitors as described in any one of the above 51) to 53), wherein the conducting material accounts for 30–99 mass % and the binder accounts for 1–70 mass % of the entire solid content of the conducting carbon paste.

DETAILED DESCRIPTION OF THE INVENTION

Figure 1:
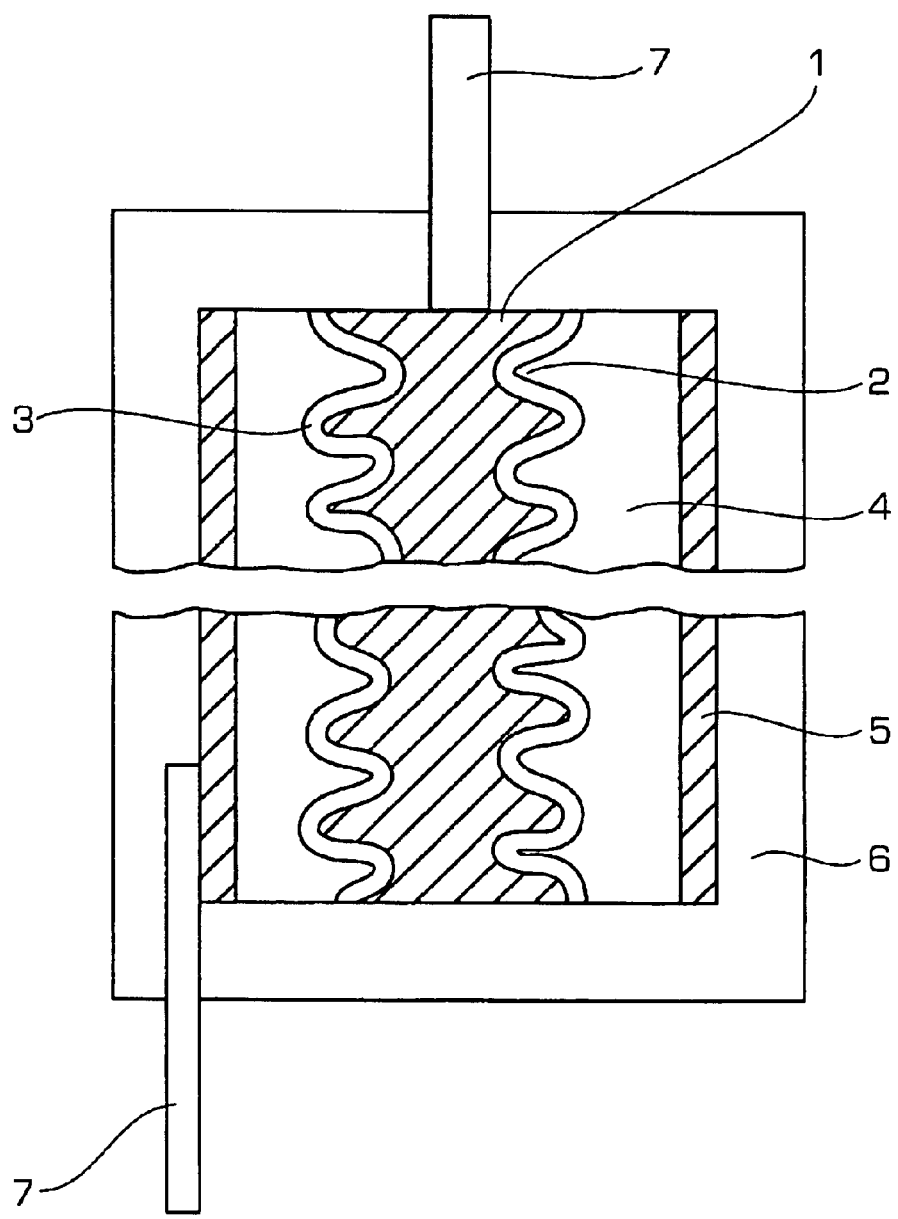
FIG. 1 is a cross-sectional view showing one example of the solid electrolytic capacitor according to the present invention.

The solid electrolytic capacitor of the present invention can be obtained by forming on the dielectric film layer formed on a valve-acting metal a solid electrolyte layer, an electrically conducting layer comprising metallic powder and an electrically conducting carbon layer which is optionally formed between the solid electrolyte layer and the electrically conducting layer comprising metallic powder, in which at least one of said solid electrolyte layer, electrically conducting layer comprising metallic powder and electrically conducting carbon layer contains a rubber-like elastic material.

The following description specifically illustrates those cases: (I) where the solid electrolyte layer contains a rubber-like elastic material; (II) where the electrically conducting layer comprising metallic powder contains a rubber-like elastic material; and (III) where the electrically conducting carbon layer contains a rubber-like elastic material but the present invention also include embodiments where any two layers or three layers of said solid electrolyte layer, electrically conducting layer comprising metallic powder and electrically conducting carbon layer contains a rubber-like elastic material.

(I) A Case Where the Solid Electrolyte Layer Contains a Rubber-like Elastic Material When a rubber-like elastic material is contained in the solid electrolyte layer, the solid electrolyte layer is preferably formed from an electrically conducting polymer composition which is in the form of a film or laminated film and contains from about 0.01 to 25 mass % of rubber-like elastic material.

In an embodiment of the present invention where at least one rubber-like elastic material is incorporated into the electrically conducting polymer composition, a heat-resistant electrically conducting polymer composition layer (charge-transfer complex) having a necessary thickness can be formed on the dielectric film layer even if the number of the covering steps is reduced. Furthermore, as a result of addition of the properties of the rubber-like elastic material, stress relaxing property can be attained. By virtue of these effects, a high-performance solid electrolyte and a solid electrolytic capacitor having excellent low impedance property and high durability in a sparking voltage test or the like can be provided.

The electrically conducting polymer in the electrically conducting polymer composition suitable for the capacitor of the present invention is a polymer having a π electron-conjugated structure in the polymer main chain. The polymer has a polymerization degree of from 2 to 1,000, preferably from 5 to 500. Specific examples thereof include polymers of a 5-membered heterocyclic compound, polyaniline, poly-p-phenylene, poly-p-phenylenevinylene, polythienylenevinylene and substituted derivatives thereof. A copolymer obtained by copolymerizing at least two monomers capable of producing the above-described polymers may also be used.

The polymers of a 5-membered heterocyclic compound usable in a preferable example is a π electron-conjugated polymer containing a structural unit represented by formula (1):

(Wherein the substituents $R^1$ and $R^2$ each independently represents a monovalent group selected from the group consisting of hydrogen, a linear or branched, saturated or unsaturated hydrocarbon group having from 1 to 6 carbon atoms, a linear or branched, saturated or unsaturated alkoxy group having from 1 to 6 carbon atoms, a hydroxyl group, a halogen atom, a nitro group, a cyano group, a trihalomethyl group, a phenyl group and a substituted phenyl group; $R^1$ and $R^2$ may be combined with each other at an arbitrary position to form at least one divalent chain for forming at least one 5-, 6- or 7-membered saturated or unsaturated ring structure; X represents a hetero atom selected from S, O, Se, Te or $NR^3$; $R^3$ represents H, a linear or branched, saturated or unsaturated hydrocarbon group having from 1 to 6 carbon atoms, a phenyl group, or a linear or branched, saturated or unsaturated alkoxy group having from 1 to 6 carbon atoms; the alkyl group and the alkoxy group represented by $R^1$, $R^2$ or $R^3$ each may optionally contain in the chain thereof a carbonyl bond, an ether bond, an ester bond, an amide bond or an imino bond; and 8 represents a number of from 0 to 1).

The polymer is more preferably a π electron-conjugated polymer containing a structural unit represented by formula (2):

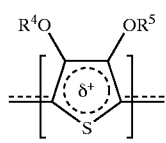

(2)

(Wherein the substituents $R^4$ and $R^5$ each independently represents hydrogen, a linear or branched, saturated or unsaturated hydrocarbon group having from 1 to 6 carbon atoms, or a substituent for forming at least one 5-, 6- or 7-membered heterocyclic structure containing the two oxygen elements shown in the formula by combining hydrocarbon groups having from 1 to 6 carbon atoms to each other at an arbitrary position; the ring structure formed in the scope thereof includes a chemical structure such as a substituted vinylene group and a substituted O-phenylene group; and δ represents a number of from 0 to 1.).

In formula (1), useful examples of the linear or branched, saturated or unsaturated hydrocarbon group having from 1 to 6 carbon atoms represented by the substituent $R^1$, $R^2$ or $R^3$ include a methyl group, an ethyl group, a vinyl group, a propyl group, an allyl group, an isopropyl group, a butyl group and a 1-butenyl group. Useful examples of the linear or branched, saturated or unsaturated alkoxy group having from 1 to 6 carbon atoms include a methoxy group, an ethoxy group, a propoxy group, an isopropoxy group and a butoxy group.

Useful examples of the substituent other than the hydrocarbon group and the alkoxy group include a nitro group, a cyano group, a phenyl group and a substituted phenyl group (e.g., phenyl group substituted by a halogen atom such as Cl, Br, F, etc.). The alkyl group or the alkoxy group represented by $R^1$ or $R^2$ each may optionally contain in the chain thereof a carbonyl bond, an ether bond, an ester bond, an amide bond or an imino bond. Particularly useful examples thereof include a methoxyethoxy group and a methoxyethoxyethoxy group.

The substituents $R^1$ and $R^2$ may be combined with each other at an arbitrary position to form at least one divalent chain for forming at least one 5-, 6- or 7-membered saturated or unsaturated ring structure. Examples of the substitution in formula (1) include 3,4-propylene-substituted structure (formula (3)), 3,4-butylene-substituted structure (formula (4)), 3,4-(2'-butenylene)-substituted structure (formula (5)), 3,4-butadienylene-substituted structure (formula (6)) and naphtho[2,3-c]-condensed structure (formula (7)):

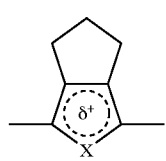

(3)

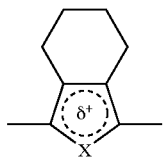

(4)

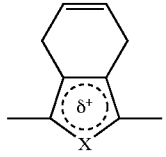

(5)

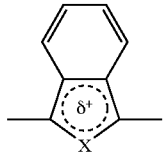

(6)

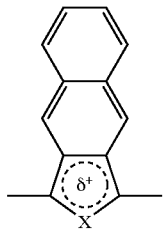

(7)

In the formulae above, X represents a hetero atom and examples thereof include S, O, Se, Te and $NR^3$. The 3,4-butadienylene-substituted structure (formula (6)) where X is S is denoted an isothianaphthenylene structure in the case of the repeating structural unit of formula (1). Similarly, the naphtho[2,3-c]condensed structure (formula (7)) is denoted a naphtho[2,3-c]thienylene structure in the case of formula (1). In the formulae, δ represents a number of charges per the repeating structural unit and is a value of from 0 to 1.

Useful examples of the substituents $R^4$ and $R^5$ in formula (2) include a methyl group, an ethyl group, a propyl group, an isopropyl group, a vinyl group and an allyl group. Also, the hydrocarbon groups having from 1 to 6 carbon atoms represented by the substituents $R^4$ and $R^5$ may be combined with each other at an arbitrary position to form at least one 5-, 6- or 7-membered heterocyclic ring structure containing the two oxygen elements shown in formula (2). Preferred examples thereof include 1,2-ethylene, 1,2-propylene and 1,2-dimethylethylene.

Furthermore, the hydrocarbon groups having from 1 to 6 carbon atoms represented by $R^4$ and $R^5$ may be combined with each other at an arbitrary position to form an unsaturated hydrocarbon ring structure such as substituted vinylene group and substituted o-phenylene group. Examples thereof include 1,2-ethylene (formula (8)), 1,2-cyclohexylene (formula (9)) and 1,2-dimethyl-o-phenylene (formula (10)):

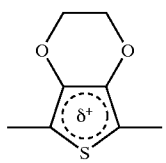

(8)

-continued

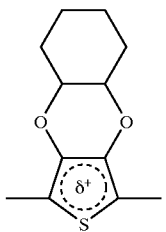
(9)

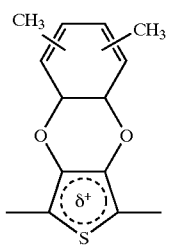
(10)

Among the monomer compounds for use in the solid electrolytic capacitor of the present invention and the production process thereof, monomer compounds such as thiophene, pyrrole and 3,4-ethylenedioxythiophene are known. Also, many of oxidizing agents which can polymerize such a monomer compound are known.

However, a capacitor comprising a solid electrolyte formed of an electrically conducting polymer composition containing a rubber-like elastic material has heretofore been not known.

The rubber-like elastic material constituting the solid electrolyte of the present invention is considered to be dissolved in the electrically conducting polymer or dispersed in the matrix of electrically conducting polymer.

In the solid electrolytic capacitor of the present invention, the rubber-like elastic material constituting the solid electrolyte of the solid electrolytic capacitor of the present invention is blended in an amount of from 0.01 to 25 mass %, preferably from 0.1 to 10 mass %, based on the π-conjugated electrically conducting polymer. The heat-resistant solid electrolytic capacitor comprising a solid electrolyte containing a rubber-like elastic material has excellent in low impedance property, high durability in a sparking voltage test and good external stress relaxing property.

If the amount of the rubber-like elastic material blended is less than 0.01 mass %, blending of the rubber-like elastic material will not give any susceptible effect, whereas if the blended amount exceeds 25 mass %, the electric conductivity of the solid electrolyte decreases. In particular, if the rubber-like elastic material increases to reverse the matrix, the electric conductivity abruptly decreases. Therefore, the amount of the rubber-like elastic material blended must be 25 mass % or less. When the blended amount is from 0.01 to 25 mass %, preferably from 0.1 to 10 mass %, based on the entire weight of the composition for the electrolyte, a capacitor particularly excellent in the low impedance property can be obtained.

Usually, the method for producing (forming) the above-described solid electrolyte plays an important role in the production of a solid electrolytic capacitor for attaining high capacitance and high frequency property and improving tan δ, leakage current, heat resistance (reflow property), impedance property and durability, etc. To this purpose, important are the π electron-conjugated structure of the electrically conducting polymer constituting the solid electrolyte, the feature that the electrically conducting polymer composition is combined with a rubber-like elastic material, and dense filling and formation of the electrically conducting polymer composition layer on a dielectric film having a microfine surface structure so as to improve the homogeneity of the electric conducting path. In particular, the said feature of the electrically conducting polymer composition has great effects on the capacitor properties.

The production process of the solid electrolyte of the present invention is characterized in that in forming the polymer having a π electron-conjugated structure, a rubber-like elastic material is added to a solution containing a monomer and/or a solution containing an oxidizing agent. By virtue of this feature, the amount of the solution attached can be increased and the necessary number of dipping steps can be reduced. Furthermore, by adding the rubber-like elastic material, the electrically conducting polymer composition can have stress relaxing property, therefore, the elasticity against aging or external pressures due to sealing or the like increases. This appears as characteristic properties. For example, the leakage current of initial properties decreases, or deteriorations in the capacitance, loss and the like after standing under high temperature and high humidity for a long period of time are reduced.

Specific examples of the present process include a process wherein a solution or dispersion of a rubber-like elastic material is mixed with a solution containing a monomer compound, the mixed solution is coated on a dielectric film having microfine pores on a valve-acting metal anode foil to cause oxidative polymerization of the monomer by the action of the oxidizing agent so that the polymer composition produced is formed as a solid electrolyte on the dielectric material surface. By performing this process once or more per one anode substrate, preferably repeating the process from 3 to 20 times, a dense solid electrolyte layer can be easily formed.

A dipping method which is one of the preferred production processes is described below as a representative example. The polymerization reaction process includes a step of dipping a valve-acting metal anode foil having formed thereon a dielectric film in a solution containing an oxidizing agent (Solution 1), and a step of dipping the foil in a solution containing a monomer compound and a rubber-like elastic material (Solution 2). The valve-acting metal anode foil may be dipped in the order written above, namely, dipping in Solution 1 and then dipping in Solution 2, or in the order reversed thereto, namely, dipping in Solution 2 and then dipping in Solution 1.

In another practical embodiment, the process may include a step of dipping the anode foil in a solution containing an oxidizing agent and a rubber-like elastic material (Solution 3), and a step of dipping the foil in a solution containing a monomer compound (Solution 4). Also in this case, the anode foil may be dipped in the order written above, namely, dipping in Solution 3 and then dipping in Solution 4, or in the order reversed thereto, namely, dipping in Solution 4 and then dipping in Solution 3. Solutions 1 to 4 each may be used in the form of a suspension.

The dipping may be replaced by covering capable of allowing the polymerization reaction to proceed on the anode foil, such as coating, spraying or spreading.

The solvents in Solutions 1 to 4 may be the same or different. Depending on the kind of solvent, a drying step may be interposed between covering with Solution 1 and covering with Solution 2, or between covering with Solution 3 and covering with Solution 4.

After the electrically conducting polymer film (solid electrolyte) is formed to produce a capacitor device, a step of washing the capacitor device with organic solvents or with water may be added. In this case, it is simple and preferred to use the solvents used in Solutions 1 to 4 as the organic solvents for washing, but any solvent may be used as long as it can dissolve the monomer compounds or the compounds holding anions having a doping ability.

When the thickness of the solid electrolyte layer is increased by repeating the above-described oxidative polymerization treatment, a solid electrolyte having excellent soldering heat resistance (heat stability) may be easily produced. In capacitors using a conventionally known solid electrolyte comprising polypyrrole or the like, the capacitor properties greatly fluctuate at high temperature or high humidity and the reliability is low. However, the solid electrolytic capacitor using a solid electrolyte comprising an electrically conducting polymer composition according to the present invention has excellent heat stability and shows good stability of the doped state.

This is because the electrically conducting polymer composition containing the rubber-like elastic material can be stepwise deposited with good filling not only on the dielectric material surface but also even insides of the pores and because a thin film of the polymer composition can be formed. In particular, when a structure of thin film layers being stacked over and over again is formed, the above-described properties can be strongly brought out, the polymer can be prevented from damaging the dielectric film, excellent heat stability can be attained, the flexibility of the rubber-like elastic material can protect the dielectric film and the electrically conducting polymer from external damages, and the capacitor using the solid electrolyte can be favored with those advantageous properties.

The rubber-like elastic material which may be used in the present invention has elasticity peculiar to gum elastic or rubber analogues and upon receiving strain by external force, behaves to resist the stain so as to restore the prior state. Specific examples thereof include common general rubbers (e.g., natural rubber and synthetic elastomers such as urethane rubber, ethylene-propylene copolymers, ethylene-propylene-diene copolymer, styrene-butadiene rubber, butyl rubber, isoprene rubber, silicon rubber, and fluororubbers) and thermoplastic elastomers (e.g., styrene-based, olefin-based, urethane-based, 1,2-polybutadiene-based and vinyl chloride-based elastomers, etc.).

The fluororubber is a generic term of synthetic elastomers containing fluorine atoms in the molecule. This is used as special elastomers and distinguished from general-purpose elastomers. Examples thereof include polymer of fluorine-containing acrylate, vinylidene fluoride-based copolymers, tetrafluoroethylene-perfluoromethylvinylether copolymers, fluorine-containing phosphazene-based rubber and fluorine-containing silicone-based rubber. The properties vary depending on the kind, however, among commercially available rubbers, the fluororubber exhibits by far high heat resistance. The fluororubber also has excellent chemical resistance and good weatherability. The silicon rubber is a rubber-like elastic material and comprises linear polymers cross-linked to each other, the liner polymers having a main chain constituted by a siloxane bond and a side chain composed of a substituent such as methyl group and phenyl group. The silicon rubber has good heat resistance and high electrical insulating property. In the polymerization reaction of the electrically conducting polymer, those which may be dissolved in organic solvents are preferably used and examples thereof include polyester urethane, polyether urethane and vinylidene fluoride-hexafluoropropylene copolymers. As the organic solvent used here, a ketone-based solvent such as ethyl methyl ketone and acetone, an acetic acid ester-based solvent such as isopropyl acetate, an ether-based solvent such as dioxane and THF, or an alcohol-based solvent such as methanol is preferably used. In the case where rubber is insoluble in organic solvents, a dispersion solution in the same solvent as the solvent of a solution containing the monomer or oxidizing agent or in a solvent capable of mixing therewith may be used.

When the solid electrolyte is required to have particularly heat resistance, fluororubber or silicon rubber having high heat resistance is used.

The oxidizing agent for use in the present invention may be any oxidizing agent if it is suitable for the oxidation polymerization of pyrroles or thiophenes. Examples of the oxidizing agent which can be used include oxidizing agents over a wide range, such as iron (III) chloride, $Fe(ClO_4)_3$, organic acid iron (III) salt, inorganic acid iron (III) salt, alkyl persulfate, persulfate, hydrogen peroxide and $K_2Cr_2O_7$ described in JP-A-2-15611 (U.S. Pat. No. 4,910,645).

Examples of the organic acid in the organic acid iron (III) salt include an alkylsulfonic acid having from 1 to 20 carbon atoms such as methanesulfonic acid and dodecylbenzene-sulfonic acid, and an aliphatic carboxylic acid having from 1 to 20 carbon atoms. However, the use range of the oxidizing agent does not include all combinations. The oxidizing agent, the reaction conditions and the like may be sometimes restricted by the chemical structure of the monomer compound.

For example, according to *Handbook of Conducting Polymers*, page 99, Fig. 5, Marcel Dekker, Inc. (1987), the species of the substituent greatly affects the oxidation potential (one index for showing whether the polymerization readily or difficultly occurs) and in turn, governs the oxidation (polymerization) of thiophenes (oxidation potential expands over a wide range of from about 1.8 to about 2.7 V). Accordingly, it is known that the combination of the monomer compound and the oxidizing agent used in practice is important. In the present invention, a combination capable of improving the capacitor properties in the production within the above-described limited range has been found and thereby the problems have been overcome.

In the electrically conducting polymer of the present invention, an anion having a doping ability is allowed to be present together, if desired, and for the anion, an electrolyte compound having as a counter ion an oxidizing agent anion (reductant of oxidizing agent) preduced from the above-described oxidizing agent, or other anionic electrolyte may be used. Specific examples thereof include chloride ion, $ClO_4^-$, aliphatic organic carboxylate anion having from 1 to 12 carbon atoms, sulfate anion, phosphate anion, aliphatic organophosphate anion having from 1 to 12 carbon atoms and borate anion. Furthermore, an electron acceptor dopant such as $NO^+$ and $NO_2^+$ salts (e.g., $NOBF_4$, $NOPF_6$, $NOSbF_6$, $NOAsF_6$, $NOCH_3SO_3$, $NO_2BF_4$, $NO_2$ $PF_6$, $NO_2CF_3SO_3$, etc.) may also be used.

In the present invention, an aromatic compound (e.g., sulfoquinone, anthracenemonosulfonic acid, substituted naphthalenemonosulfonic acid, substituted benzenesulfonic acid) or a heterocyclic sulfonic acid may be used, which differs from conventionally known molecular anions (e.g., $ClO_4^-$, $BF_4^-$, etc.) in the doping ability (stability of charge transfer complex, electric conductivity, etc.) and the chemical properties, and exhibits superior effects as compared with the system of using a conventionally known molecular anion mentioned above ($ClO_4^-$, $BF_4^-$, etc.) alone, in other words, which can bring about particularly excellent effects when a plurality of capacitor devices are manufactured and compared on the capacitor performance.

The sulfoquinone for use in the present invention is a generic term of the compounds having one or more sulfonic acid groups and a quinone structure within a molecule. The chemical structure may be any if the compound can effectively act as a dopant in the form of sulfonate anion. Examples of the sulfoquinone basic skeleton include p-benzoquinone, o-benzoquinone, 1,2-naphthoquinone, 1,4-naphthoquinone, 2,6-naphthoquinone, 9,10-anthraquinone (hereinafter simply referred to as an "anthraquinone"), 1,4-anthraquinone, 1,2-anthraquinone, 1,4-chrysenequinone, 5,6-chrysenequinone, 6,12-chrysenequinone, acenaphthoquinone, acenaphthenequinone, camphorquinone, 2,3-bornanedione, 9,10-phenanthrenequinone and 2,7-pyrenequinone.

The sulfonic acid group in the sulfoquinone includes an aromatic sulfonic acid structure resulting from displacing at least one hydrogen of the quinone compound by a sulfonic acid group, and an aliphatic sulfonic acid structure resulting from displacing at least one hydrogen by sulfoalkylene group through a divalent saturated or unsaturated hydrocarbon group having from 1 to 12 carbon atoms. Furthermore, a chemical structure resulting from substituting at least one hydrogen atom of the sulfoquinone with a substituent selected from saturated or unsaturated alkyl or alkoxy groups having from 1 to 12, preferably from 1 to 6, carbon atoms and F, Cl and Br may also be used.

In particular, the sulfoquinone for use in the present invention is preferably a sulfoquinone having a skeleton of anthraquinone, 1,4-naphthoquinone or 2,6-naphthoquinone. Examples thereof include, in the case of anthraquinones, anthraquinone-1-sulfonic acid, anthraquinone-2-sulfonic acid, anthraquinone-1,5-disulfonic acid, anthraquinone-1,4-disulfonic acid, anthraquinone-1,3-disulfonic acid, anthraquinone-1,6-disulfonic acid, anthraquinone-1,7-disulfonic acid, anthraquinone-1,8-disulfonic acid, anthraquinone-2,6-disulfonic acid, anthraquinone-2,3-disulfonic acid, anthraquinone-2,7-disulfonic acid, anthraquinone-1,4,5-trisulfonic acid, anthraquinone-2,3,6,7-tetrasulfonic acid, and alkali metal salts and ammonium salts thereof.

Examples thereof include, in the case of 1,4-naphthoquinones, 1,4-naphthoquinone-5-sulfonic acid, 1,4-naphthoquinone-6-sulfonic acid, 1,4-naphthoquinone-5,7-disulfonic acid, 1,4-naphthoquinone-5,8-disulfonic acid, and alkali metal salts and ammonium salts thereof.

Examples thereof include, in the case of 2,6-naphthoquinones, 2,6-naphthoquinone-1-sulfonic acid, 2,6-naphthoquinone-3-sulfonic acid, 2,6-naphthoquinone-4-sulfonic acid, 2,6-naphthoquinone-3,7-disulfonic acid, 2,6-naphthoquinone-4,8-disulfonic acid, and alkali metal salts and ammonium salts thereof.

The sulfoquinone may also be selected from industrial dyes and examples thereof include Anthraquinone Iris R and Anthraquinone Violet RN-3RN. These industrial dyes are a useful sulfoquinone-based dopant and each may be used in the form of the above-described salt.

Some sulfoquinone compounds for use in the present invention participate in the polymerization reaction of the monomer compound and act as one oxidative dehydrogenating agent. As a result, the sulfoquinone is reduced and the resulting proton adduct of the quinone structure, namely, hydroquinone structure, or quinhydron may be contained as it is as a dopant in the solid electrolyte.

The anthracenemonosulfonic acid for use in the present invention is a generic term of anthracenemonosulfonic acid compounds of which anthracene skeleton is substituted by one sulfonic acid group. Preferred examples of the compound include unsubstituted anthracenesulfonic acid and substituted compounds such that at least one hydrogen on the anthracene ring of anthracenesulfonic acid is substituted with a linear or branched, saturated or unsaturated hydrocarbon group having from 1 to 12, preferably from 1 to 6 carbon atoms or by a linear or branched, saturated or unsaturated alkoxy group having from 1 to 12, preferably from 1 to 6 carbon atoms.

Specific examples of the compound which provides the unsubstituted anthracenemonosulfonate anion include anthracene-1-sulfonic acid, anthracene-2-sulfonic acid, anthracene-9-sulfonic acid, and alkali metal salts and ammonium salts thereof. Specific examples of the substituent of the substituted anthracenemonosulfonic acid compound where hydrogen on the anthracene ring is further substituted, include an alkyl group such as methyl, ethyl, propyl, isopropyl, butyl, isobutyl, t-butyl, pentyl, hexyl, octyl, decyl and dodecyl; an unsaturated group such as vinyl, allyl, 3-butenyl and 5-hexenyl; and methoxy, ethoxy, propyloxy, butoxy, pentoxy, hexyloxy, octyloxy, decyloxy, dodecyloxy, etc.

The substituted naphthalenemonosulfonic acid for use in the present invention is a generic term of substituted naphthalenemonosulfonic acid compounds where the naphthalene skeleton is substituted by one sulfonic acid group, and alkoxy-substituted naphthalenemonosulfonic acid compounds. Preferred are the compounds in which at least one hydrogen on the naphthalene ring of naphthalenemonosulfonic acid may be displaced by a linear or branched, saturated or unsaturated alkoxy group having from 1 to 12, preferably from 1 to 6, carbon atoms.

Specific examples of the compound which provides the unsubstituted anthracenemonosulfonate anion include the compounds having a compound skeleton such as naphthalene-1-sulfonic acid, naphthalene-2-sulfonic acid, and alkali metal salt, ammonium metal salt and organic quaternary ammonium salt thereof, and also having a chemical structure where at least one hydrogen on the naphthalene ring may be displaced by an alkoxy group.

The substituted benzenesulfonic acid for use in the present invention is a generic term of benzenesulfonic acid of which benzene skeleton is substituted by at least one sulfonic acid group, and alkyl-substituted benzenesulfonic acid. Preferred are unsubstituted benzenesulfonic acid and substituted compounds resulting from substitutng at least one hydrogen on the benzene ring of benzenesulfonic acid with a linear or branched, saturated or unsaturated hydrocarbon group having from 1 to 20, preferably from 1 to 12, carbon atoms.

The heterocyclic sulfonate anion which can be used in the present invention is a generic term of heterocyclic sulfonic acid compound anion having a chemical structure where the heterocyclic ring is substituted by at least one sulfonic acid group directly or indirectly through an alkylene group. Examples of preferred skeletons for the heterocyclic compound include skeletons of morpholine, piperidine, piperazine, imidazole, furan, 1,4-dioxane, benzimidazole, benzothiazolylthio, benzoisoxazole, benzotriazole and benzofuran.

Specific examples of the compound which provides the heterocyclic sulfonate anion include 2-imidazolesulfonic acid, 4-morpholinopropanesulfonic acid, furan-3-sulfonic acid, 2-benzimidazolesulfonic acid, 2-benzimidazolepropanesulfonic acid, 4-methyl-1-piperazinomethanesulfonic acid, 2,3-benzofurane-3-sulfonic acid, and their alkali metal salts such as sodium salt, ammonium salts and quaternary ammonium salts.

Although not necessarily limited, an aromatic sulfonic acid compound (sodium dodecylbenenesulfonate, sodium naphthalenesulfonate, sodium anthraquinone-2-sulfonate, ammonium anthraquinone-2,6-disulfonate, sodium 1,4-naphthoquinone-2-sulfonate, sodium 3-methyl-2-anthraquinolylmethanesulfonate, sodium anthracene-1-sulfonate, sodium anthracene-2-sulfonate, tetrabutyl ammonium 9,10-dimethoxyanthracene-2-sulfonate, tetrabutyl ammonium 9,10-dihexylanthracene-2-sulfonate, sodium 2-propyloxynaphthalene-6-sulfonate, tetrabutylammonium 2-propyloxynaphthalene-6-sulfonate, sodium 2-methoxynaphthalene-6-sulfonate, tetrabutylammonium 2,3-dimethoxynaphthalene-6-sulfonate, etc.) or a heterocyclic sulfonic acid (sodium 4-morpholinopropanesulfonate, sodium 2-benzimidazolepropanesulfonate, sodium 4-methyl-1-piperazinomethanesulfonate, sodium 2,3-benzofurane-3-sulfonate, etc.) is preferably used.

In the process for producing a solid electrolytic of the present invention, the oxidizing agent used for causing chemical polymerization of thiophene or pyrrole monomer compounds is suitably persulfate. Examples of the persulfate which can be particularly suitably used for causing chemical polymerization of thiophenes include ammonium persulfate and potassium persulfate. Use of iron (III) salt-based oxidizing agent is disadvantageous in view of the capacitor properties because an iron (element) inevitably remains in the electrically conducting polymer composition.

Also, the persulfate which is suitable for the above-described monomer compound is not suitable for the thiophene monomer and cannot be used as an oxidizing agent. Thus, the persulfate has a limit in that depending on the kind of monomer, use thereof is not available.

Preferred conditions in the formation (polymerization reaction) of the electrically conducting polymer composition layer are described below.

In the production process of a capacitor according to the present invention, the concentrations of the monomer compound, the oxidizing agent, the dopant and the rubber-like elastic material used each varies depending on the kind of the monomer, oxidizing agent, dopant or rubber-like elastic material (including the kind of the substituent) or depending on the combination with a solvent or the like. In general, the monomer concentration is from $1\times10^{-4}$ to 10 mol/e, preferably from $1\times10^{-3}$ to 5 mol/e.

The reaction temperature varies depending on the kind of each reaction composition, the reaction process or the like and cannot be specifically limited, but in general, the reaction temperature is from −70 to 250° C., preferably from −20 to 150° C., more preferably from 0 to 100° C.

Examples of the solvent for use in the production process of the present invention or for use in washing after the polymerization include ethers such as tetrahydrofuran (THF), dioxane and diethyl ether; ketones such as acetone and methyl ethyl ketone; aprotic polar solvents such as dimethylformamide, acetonitrile, benzo-nitrile, N-methylpyrrolidone (NMP) and dimethylsulfoxide (DMSO); esters such as ethyl acetate, butyl acetate and isopropyl acetate; non-aromatic chlorinated hydrocarbon solvents such as chloroform and methylene chloride; nitro compounds such as nitromethane, nitroethane and nitrobenzene; alcohols such as methanol, ethanol and propanol; organic acids such as formic acid, acetic acid and propionic acid; acid anhydrides of the organic acid (e.g., acetic anhydride); water and a mixed solvent thereof. Among these, preferred are water, alcohols, ketones, acetic acid esters and/or mixed systems thereof.

The thus-produced solid electrolyte has an electric conductivity of from 0.1 to 200 S/cm, preferably from 1 to 100 S/cm, more preferably from 10 to 100 S/cm.

The construction of the solid electrolytic capacitor of the present invention is roughly described below by referring to FIG. 1.

For one part electrode (anode) 1 having on the entire surface thereof pores 2 connected to a connecting lead 7, a known material may be used, for example, a metal foil or bar having a valve action such as aluminum, titanium, tantalum, niobium or an alloy using such a metal as a substrate, or a sintered material mainly comprising such a material. The surface of the metal electrode is subjected to etching or electrochemical forming by a known method so as to form a dielectric film layer and increase the specific surface area. Thus, a metal foil having formed thereon a metal oxide film layer 3 is used.

The solid electrolyte (electrically conducting polymer composition) 4 is preferably formed by a process of polymerizing a monomer compound on the dielectric film layer of the valve-acting metal electrode foil. The solid electrolyte is more preferably formed by a process of chemically depositing an electrically conducting polymer composition containing a rubber-like elastic material and thereby rendered to have excellent heat resistance and high impact strength on a dielectric film layer having a porous or void structure.

In the solid electrolytic capacitor, another electrically conducting layer is further provided on the electrically conducting polymer composition layer formed above so as to achieve good electrical contact. The electrically conducting layer 5 is formed, for example, by applying electrically conducting paste, plating, metallization or electrically conducting resin film.

The solid electrolytic capacitor thus manufactured by the production process of the present invention is covered with a jacket 6 by resin molding on the electrically conducting layer, by housing in a resin case or a metal-made jacket case or by resin dipping, and then connecting leads 7 are provided thereto. Thereafter, the capacitor can be used as a product solid electrolytic capacitor suitable for various uses.

(II) A Case Where the Electrically Conducting Layer Comprising Metal Powder Contains a Rubber-like Elastic Material When a rubber-like elastic material is contained in the electrically conducting layer containing metal powder, an electrically conducting paste is used, which comprises electrically conducting filler containing metal powder and a rubber-like elastic material as a main component of the binder.

Specific examples of the rubber-like elastic material include common general rubbers (e.g., natural rubber and synthetic elastomers such as urethane rubber, ethylene-propylene copolymers, ethylene-propylene-diene copolymer, styrene-butadiene rubber, butyl rubber, isoprene rubber, silicon rubber, and fluororubbers) and thermoplastic elastomers (e.g., styrene-based, olefin-based, urethane-based, 1,2-polybutadiene-based, vinyl chloride-based, etc.).

Among these, silicon rubber and fluororubber which are excellent in heat resistance are preferred and particularly fluororubber is preferred.

The fluororubber is a generic term of synthetic elastomers containing fluorine atoms in the molecule. This is used as special elastomers and distinguished from general-purpose elastomers. Examples thereof include polymer of fluorine-containing acrylate, vinylidene fluoride-based copolymers, tetrafluoroethylene-perfluoromethylvinylether copolymers, fluorine-containing phosphazene-based rubber and fluorine-containing silicone-based rubber. The properties vary depending on the kind, however, among commercially available rubbers, the fluororubber exhibits by far high heat resistance. The fluororubber also has excellent chemical resistance and good weatherability.

The solvent used in the electrically conducting paste may be a solvent used in a conventional electrically conducting paste. For example, mention may be given of N-methyl-2-pyrrolidone, N,N-dimethylacetamide, dimethylformamide, and butyl acetate, and these may be used singly or in combination of two or more species. The amount of the solvent incorporated into the paste must be regulated in order to obtain the viscosity of the paste which meets the purpose for use of the paste. Typically, the solvent is incorporated in an amount of 1–10 times that of solid components in the paste.

In addition to silver powder, a powder metal such as gold and copper and the like, or a carbon powder may also be used as the electrically conducting filler for use in the electrically conducting paste, but silver powder is most preferred. The paste preferably contains silver powder in an amount of 80 mass % or more of the entire filler. The particle size of the powder is preferably from 1 to 10 μm in terms of the average particle size. If the average particle size is less than 1 μm, the bulk density is small and a paste having a large volume results, which is disadvantageous in the formation of the electrically conducting layer. On the other hand, if the average particle size exceeds 10 μm, the filler is excessively coarse and connection with the cathode lead terminal is liable to fail.

The constitution of a preferable binder which is based on fluororubber is described below as a representative example.

The binder mainly comprises fluororubber (fluorocarbon rubber). The fluororubber preferably occupies from 80 to 100 mass % of the binder. For the remaining component, conventional resin or the like may be mixed. The fluororubber has rubber elasticity and exhibits behavior of, when strained, restoring the state before the straining. In this meaning, the fluororubber is distinguished from fluororesin which cannot be restored from straining. Examples of the fluororubber which can be used include known vinylidene fluoride-type copolymer rubber, hexafluoropropylene copolymer rubber, tetrafluoroethylene copolymer rubber, fluorine-containing acrylate rubber and fluorine-containing silicone rubber. These fluorocarbon rubbers are not vulcanized and have a glass transition point (Tg) lower than room temperature. Also in this point, the fluororubber is distinguished from fluororesin.

The electrically conducting filler and the binder are preferably mixed at a ratio such that the electrically conducting filler is from 50 to 95 mass % and the binder is from 5 to 50 mass %. If the electrically conducting filler is less than 50 mass %, the electric conductivity decreases, whereas if it exceeds 95 mass %, the bonding strength of the binder (less than 5 mass %) is reduced and an electrically conducting layer is difficult to form.

In order to impart an appropriate viscosity as a paste to the mixture (solid) of the electrically conducting filler and the binder, an organic solvent is usually added. A solvent capable of dissolving the fluororubber is preferred. Examples of the organic solvent which can be used include butyl acetate, amyl acetate and propyl acetate. The organic solvent in general is suitably added in an amount of from 40 to 100 parts by mass per 100 parts by mass of the solid content.

Next, a solid electrolytic capacitor in which an electrically conducting paste containing a rubber-like elastic material of the present invention is used will be described.

Figure 2:
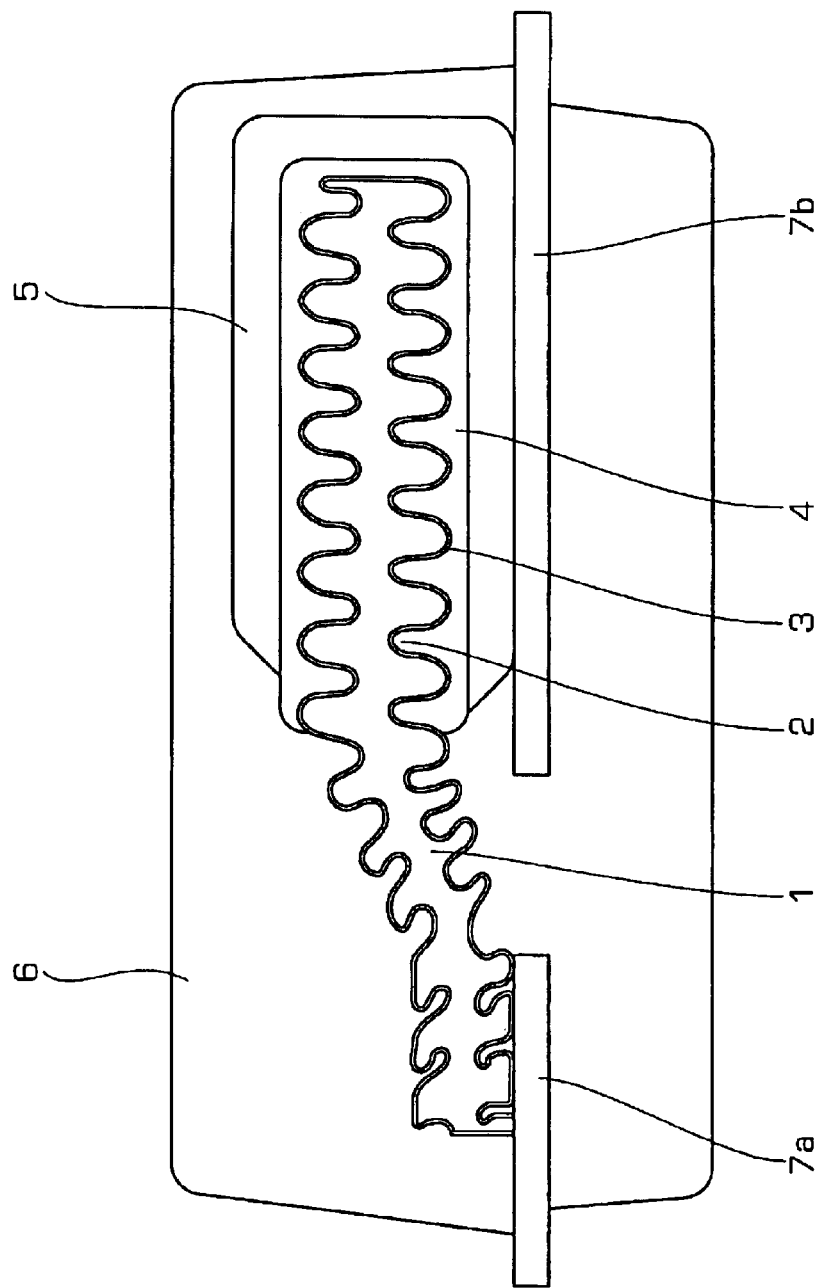
FIG. 2 is a cross-sectional view showing another example of the solid electrolytic capacitor according to the present invention.
Figure 3:
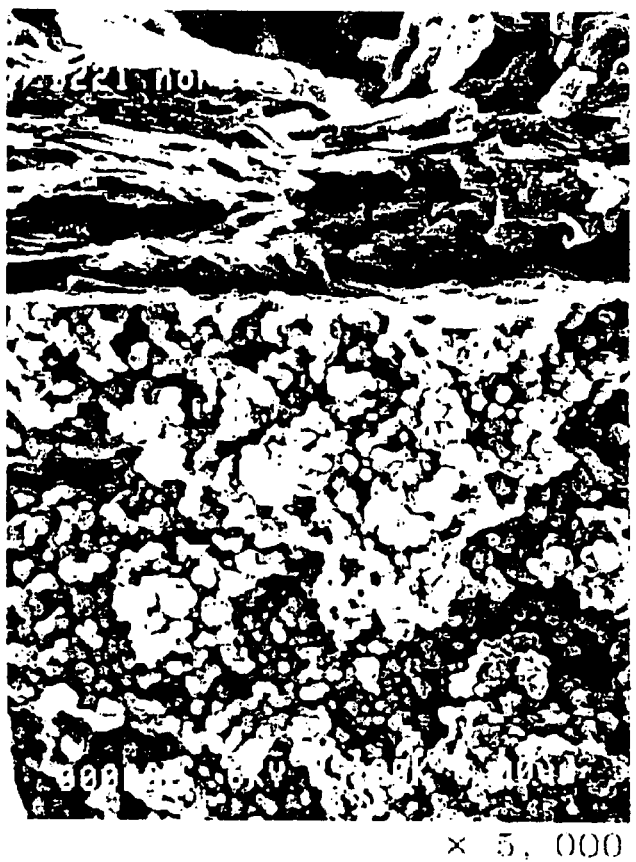
FIG. 3 is a photograph by an electron microphotograph (×5,000) of the electrically conducting polymer layer according to the present invention, where 1 is a valve-acting metal electrode, 2 is a pore (microfine pore), 3 is a dielectric film, 4 is an solid electrolyte layer, 5 is an electrically conducting layer, 6 is a jacket, 7 is a connecting terminal, 7a is an anode terminal and 7b is a cathode terminal.

An example of the solid electrolytic capacitor of the present invention is shown in FIG. 2.

In FIG. 2, 1 is a valve acting metal foil (anode) such as aluminum, tantalum and the like, and on the surface thereof, an oxide dielectric film 3 is formed by electrolytic anodic oxidation, and pores 2 is formed. To the anode 1, an anode lead terminal 7a is connected by welding or the like. 4 is a solid electrolyte layer (cathode) formed on the oxide film 3. For the solid electrolyte layer, an inorganic semiconductor compound may also be used, however, when the electrically conducting paste of the present invention is used, an electrically conducting polymer is particularly suitable for the solid electrolyte.

The electrically conducting polymer which can be used has been described in detail in the above section (I) regarding the case where the solid electrolyte layer contains a rubber-like elastic material. Examples of the electrically conducting polymer which can be used include poly(3,4-ethylenedioxyethiophene), polypyrrole, polyaniline and the like. Among these, polypyrrole and poly(3,4-ethylenedioxythiophene) are preferred. To this polymer, a dopant is added. Examples of the dopant include anthraquinonesulfonate anion, alkyl-anthraquinonesulfonate anion, alkoxyanthraquinonesulfonate anion, anthracenesulfonate anion, alkylanthracenesulfonate anion, alkoxyanthracenesulfonate anion, naphthalenesulfonate anion, alkylnaphthalenesulfonate anion, alkoxy-naphthalenesulfonate anion, benzenesulfonate anion, alkylbenzenesulfonate anion and alkoxybenzenesulfonate anion. The sulfonic acid substituent in these organic sulfonate anions may be sufficient if it is bonded at any position capable of bonding to the skeleton compound. Also, out of the above-described compounds, those having an alkyl or alkoxy group have a chemical structure such that an alkyl or alkoxy group is bonded to any position capable of bonding to the skeleton compound.

The electrically conducting polymer may be formed by a known method such as chemical polymerization using an oxidizing agent (polymerization initiator) of the monomer for forming the polymer, electrolytic polymerization or a combination thereof. For example, the oxide film layer is dipped in a monomer solution, then dipped in an oxidizing agent solution and heated to cause chemical polymerization. This operation is repeated multiple times. By this repeated polymerization, the electrically conducting polymer layer can have a multi-layer structure and exhibit excellent resistance against thermal stress at the time of sealing with a jacket resin.

A solid electrolyte layer formed from such an electrically conducting polymer containing a rubber-like elastic material as mentioned above can be also preferably used.

The fluororubber binder used for the electrically conducting paste acts as follows. Although the electrically conducting polymer layer having a multi-layer structure exhibits excellent resistance against thermal stress, if an electrically conducting paste using a binder having a large heat shrinkage such as epoxy resin is coated thereon, the paste invades into the surface layer of the electrically conducting polymer. This paste generates great stress at the heating and affects the multi-layer form of the electrically conducting polymer layer. In the case where a fluororubber binder is used, the paste invaded into the surface layer of the electrically conducting polymer generates small thermal stress and the shape of the electrically conducting polymer layer formed can be maintained. As a result, the capacitor can have higher heat resistance.

Examples of the oxidizing agent used in the chemical polymerization include ammonium persulfate, organic sulfonic acid iron (III), inorganic acid iron such as iron (III) chloride, $Fe(ClO_4)_3$, organic carboxylic acid iron (III), persulfate, alkyl persulfate, hydrogen peroxide and $K_2Cr_2O_7$.

On the surface of the solid electrolyte layer 4, an electrically conducting layer 5 is formed. The electrically conducting layer 5 is closely attached to the solid electrolyte layer to work out as a cathode and in addition, acts as an adhesive for connecting the cathode lead terminal 7b. The electrically conducting layer 5 generally has a thickness of approximately from 10 to 50 µm.

The electrically conducting layer 5 may be formed of the electrically conducting paste of the present invention alone. However, as will be described in the next section in detail, it is preferred to provide a layer formed of carbon paste on the electrically conducting polymer layer 4 and on the layer formed, provide a layer formed of the electrically conducting paste of the present invention. The carbon paste used may be a known carbon paste prepared by adding a binder resin and a solvent to graphite powder and in this case, fluororubber described above is preferably used as the binder resin. The carbon paste layer may have a thickness as small as approximately from 1 to 2 µm.

To the outer surface of the electrically conducting layer 5, a cathode lead terminal 7b is connected. Thereafter, the whole is sealed with an insulating resin 6 exclusive of the exposed areas of the cathode lead terminal 7b and the anode lead terminal 7a. As the insulting resin, epoxy resin is predominantly used. The sealing may be performed, for example, by transfer molding.

(III) A Case Where the Electrically Conducting Carbon Layer Contains a Rubber-like Elastic Material The electrically conducting carbon layer is formed from an electrically conducting carbon paste mainly comprising an electrically conducting material, a binder, and a solvent, and the conducting material preferably contains artificial graphite powder in an amount of 80 mass % or more. The artificial graphite powder preferably has a fixed carbon content of 97 mass % or more, has an average particle size of 1–13 µm and an aspect ratio of 10 or less, and contains particles having a particle size of 32 µm or more in an amount of 12 mass % or less.

Any flake or leaf-shaped natural graphite has an aspect ratio of more than 10, and thus differs from the conducting material of the present invention. When artificial graphite has high aspect ratio, the conducting carbon paste exhibits low packing and high electrical resistance. Therefore, artificial graphite powder must have an aspect ratio of 10 or less. Such artificial graphite has high purity as compared with natural graphite or carbon black, and thus, has a property of low heat deterioration, and packing density can be increased.

The fixed carbon content of the artificial graphite powder also affects the electrical resistance of the paste. That is, as the fixed carbon content of the artificial graphite powder is in a higher level, the electrical resistance can be made lower. Therefore, in order to attain an object of the present invention, artificial graphite having a fixed carbon content of 97 mass % or more must be used. The fixed carbon content serves as an indicative of actual carbon content, and measured by means of the JIS method (JIS K2425), the Carbon Association method, the ASTM method, or the BS method.

In order to obtain uniform applicability of the conducting carbon paste, the artificial graphite powder has an average particle size of 1–13 µm. When artificial graphite powder having an average particle size of more than 13 µm is used, a uniform paste layer may not be formed. When such a powder is used in a solid electrolytic capacitor, characteristics of the capacitor such as tan δ and equivalent series resistance (ESR) may deteriorate. Even when the average particle size of artificial graphite powder falls within the above range, coarse particles contained in the powder may inhibit uniform application of the paste. However, when the powder contains particles having particle size of 32 µm or more in an amount of 12 mass % or less, no such problems arise.

The conducting material in the conducting carbon paste of the present invention must be a material containing the above-described artificial graphite powder in an amount of at least 80 mass %. When natural graphite and carbon black are used in combination and the content of the artificial graphite becomes less than 80 mass %, the conductivity of the obtained conducting carbon paste is not satisfactory. The artificial graphite is preferably contained in an amount of 95 mass % or more, more preferably 100 mass %. The remaining components in the conducting material are metal powders such as silver, gold, and copper; carbon black; natural graphite; or other electrically conducting powders.

The solid electrolytic capacitor of the present invention is produced by use of the conducting carbon paste predominantly comprising the conducting material containing artificial graphite powder in an amount of 80 mass % or more, a binder, and a solvent. Artificial graphite powder which does not have the above-described limitations in terms of fixed carbon content, average particle size, and aspect ratio may be used in the present invention, but the paste containing the above-limited artificial graphite is preferably used.

The binder contained in the conducting carbon paste is a material of rubber-like elasticity (hereinafter also referred to as "rubber elastic material") and, when distortion is applied, exhibiting a property of recovering from distortion. Preferably, in one embodiment of the present invention, the binder is a material which can be swollen or suspended in a solvent and is a rubber elastic material of excellent heat resistance with respect to reflow soldering treatment in the production process of a capacitor. Specific examples of materials having the aforementioned properties include isoprene rubber, butadiene rubber, styrene/butadiene rubber, nitrile rubber, butyl rubber, ethylene/propylene copolymers (EPM, EPDM, etc.), acrylate rubber, polysulfide rubber, fluoropolymers, silicone rubber, and other thermoplastic elastomers. Of these, EPM, EPDM, and fluoropolymers are preferably used. No particular limitation is imposed on the type of fluoropolymer, so long as the polymer is a fluorine-containing polymer. These rubber polymers have low elastic modulus and low water absorbability and are effective for relaxing stress at adhered portions, as compared with an epoxy resin generally used in an electrically conducting carbon paste.

Examples of the aforementioned fluoropolymers include polytetrafluoroethylene, poly(chlorotrifluoroethylene), binary copolymers of vinylidene fluoride (VDF) and hexafluoropropylene (HFP), tetrafluoroethylene-containing copolymers, tetrafluoroethylene-propylene copolymers, poly(vinylidene fluoride), poly(vinyl fluoride), fluorine-containing acrylate rubber, and fluorine-containing silicone rubber.

In the conducting carbon paste, the conducting material is incorporated in an amount of 30–99 mass % based on the entirety of solid components, preferably 50–90 mass %. The binder resin is incorporated into the paste in an amount of 1–70 mass % based on the entirety of solid components. When the amount of the conducting material is less than 30 mass %, conductivity of the paste may become excessively low, whereas when the amount is in excess of 99 mass %, adhesion and stress-relaxing ability of the paste may be lost.

The solvent used in the conducting carbon paste may be a solvent used in a conventional conducting carbon paste. For example, mention may be given of N-methyl-2-pyrrolidone, N,N-dimethylacetamide, dimethylformamide, and butyl acetate, and these may be used singly or in combination of two or more species. The amount of the solvent incorporated into the paste must be regulated in order to obtain the viscosity of the paste which meets the purpose for use of the paste. Typically, the solvent is incorporated in an amount of 1–10 times that of solid components in the paste.

When a solid electrolytic capacitor is produced by use of the conducting carbon paste of the present invention, a material which has large surface area may be used as a positive electrode. The material includes etched foils of single metals having a valve action, such as aluminum, tantalum, niobium, titanium, and zirconium, and etched foils of alloy of such metals, and sintered materials of micropowders of such metals.

A dielectric layer is formed on the surface of such a metal by means of forming treatment or similar treatment, and a solid semiconducting layer (preferably a solid electrolyte layer formed of a conducting polymer as mentioned above) is formed on the dielectric layer. Subsequently, a layer of the conducting carbon paste of the present invention is formed on the semiconducting layer, and a metal-containing conducting layer, preferably a metal-containing conducting layer containing a rubber-like elastic material as mentioned above is formed thereon, and a lead wire is attached to produce a solid electrolytic capacitor.

The solid electrolytic capacitor making use of the conducting carbon paste of the present invention has high heat resistance, low ESR and low impedance, and excellent moisture resistance, and provides low heat deterioration of impedance.

BEST MODE FOR CARRYING OUT THE INVENTION

The present invention will be more specifically described below referring to Examples, Comparative Examples and Reference Examples. These descriptions, however, should not be construed for limiting the present invention.

EXAMPLE 1

A formed aluminum foil processed to have a prescribed area was subjected to electrochemical forming at 13 V in an aqueous 10 mass % ammonium adipate solution to form a dielectric film on the foil surface. The formed aluminum foil (substrate) was dipped in a solution (Solution 4) obtained by dissolving 0.05 g of polyester urethane rubber in 1.2 mol/e of ethyl methyl ketone having dissolved therein 5 g of 3,4-ethylene-dioxythiophene (Baytron™ M, produced by Bayer A G), and subsequently dipped in an aqueous solution prepared to have an ammonium persulfate (hereinafter simply referred to as "APS") concentration of 20 mass % and a sodium 2-anthraquinonesulfonate (produced by Tokyo Kasei K. K.) concentration of 0.125 mass % (Solution 3).

The resulting substrate was taken out and left standing in an environment at 60° C. for 10 minutes, thereby completing the oxidative polymerization, and then the substrate was washed with water. The polymerization reaction treatment and the washing process each was repeated 10 times. The electrically conducting polymer layer was checked by an electron microscope photograph and it was confirmed that the conducting polymer layer forms a lamellar structure.

The substrate after the polymerization treatment was reduced with hydrazine in a water/isopropyl alcohol and then carefully extracted and the contents of sulfate ion and 2-anthraquinonesulfonate ion in the electrically conducting polymer composition were determined by an ion chromatography method. As a result, the sulfate ion content was 1.5 mol % and the 2-anthraquinonesulfonate ion content was 14.0 mol %, per all repeating structural units of the polymer in the electrically conducting polymer composition. The increase in the weight of the substrate due to attachment was 15% of the weight of the substrate having no addition. The solid electrolyte layer had an electric conductivity of 73 S/cm.

Thereafter, the aluminum foil substrate having deposited thereon poly-3,4-ethylenedioxythiophene composition was treated in an aqueous 10 mass % ammonium adipate solution and then examined on the sparking voltage. The test was performed by increasing the number of devices for the comparison purpose of the device properties (the same in the following Examples). Namely, the test was performed n=5 times in an environment of 50° C. under the condition of a current density being 10 mA/cm$^2$. The results obtained are shown in Table 1.

Subsequently, the aluminum core part of the solid electrolytic capacitor was welded with a plus side lead for collecting the current from the anode and also connected to a minus side lead through carbon paste and silver paste for collecting the current from the cathode. These elements were finally sealed with epoxy resin to manufacture a capacitor device. The thus-manufactured capacitor device was aged at 125° C. for 2 hours and then subjected to measurement of initial properties. The results obtained are shown together in Table 2.

In the Table, C in the column of initial properties indicates a capacitance and DF indicates a tangent of the logs angle (tan δ). These were each measured at 120 Hz. Z (impedance) is shown by a value at a resonance frequency. LC (leakage current) was measured one minute after application of a rated voltage. Each of the measured values is an average of 30 samples. With respect to LC, those having an LC of 1 μA or more were determined as defective and those having an LC of 10 μA or more were determined as shorted products. The average LC was calculated exclusive of these.

COMPARATIVE EXAMPLE 1

A capacitor device was obtained through the same processing as in Example 1 except that polyester urethane rubber was not added, and then evaluated in the same manner as in Example 1. The results obtained are shown in Tables 1 and 2.

The contents of sulfate ion and 2-anthraquinone-sulfonate ion in the polymer composition were determined by the method described in Example 1, as a result, the sulfate ion content was 1.6 mol % and the 2-anthraquinonesulfonate ion content was 13.5 mol %. The solid electrolyte layer had an electric conductivity of 70 S/cm.

EXAMPLE 2

A capacitor device was obtained through the same processing as in Example 1 except that the repeating times of the oxidation polymerization was changed from 10 times to 7 times in Example 1, and then evaluated in the same manner as in Example 1. The results obtained are shown in Tables 1 and 2.

The contents of sulfate ion and 2-anthraquinone-sulfonate ion in the polymer composition were determined by the method described in Example 1, as a result, the sulfate ion content was 1.2 mol % and the 2-anthraquinonesulfonate ion content was 13.0 mol %. The amount of attachment was almost the same as that in the case of 10 times dipping without polyester urethane rubber. The solid electrolyte layer had an electric conductivity of 70 S/cm.

EXAMPLE 3

A capacitor device was obtained through the same processing as in Example 1 except that the polyester urethane rubber was replaced by tetrafluororethylene-propylene copolymer in the acetone solution having the same concentration as in Example 1. The capacitor device obtained was evaluated in the same manner as in Example 1. The results obtained are shown in Tables 1 and 2.

The contents of sulfate ion and 2-anthraquinone-sulfonate ion in the polymer composition were determined by the method described in Example 1, as a result, the sulfate ion content was 1.8 mol % and the 2-anthraquinonesulfonate ion content was 15.8 mol %. The increase in the weight of the substrate was 25%. The solid electrolyte layer had an electric conductivity of 65 S/cm.

EXAMPLE 4

A capacitor device was obtained through the same processing as in Example 1 except that sodium 2-anthraquinonesulfonate was replaced by a sodium dodecylbenzenesulfonate solution having the same concentration in Example 1, and then evaluated in the same manner as in Example 1. The results obtained are shown in Tables 1 and 2.

The contents of sulfate ion and dodecylbenzene-sulfonate ion in the polymer composition were determined by the method described in Example 1, as a result, the sulfate ion content was 1.3 mol % and the dodecylbenzenesulfonate ion content was 14.5 mol %. The increase in the weight of the substrate was 20%. The solid electrolyte layer had an electric conductivity of 67 S/cm.

EXAMPLE 5

A capacitor device was obtained through the same processing as in Example 1 except that the polyester urethane rubber was replaced by vinylidene fluoride-hexafluoropropylene copolymer in the acetone solution having the same concentration as in Example 1. The capacitor device obtained was evaluated in the same manner as in Example 1. The results obtained are shown in Tables 1 and 2.

The contents of sulfate ion and 2-anthraquinone-sulfonate ion in the polymer composition were determined by the method described in Example 1, as a result, the sulfate ion content was 1.4 mol % and the 2-anthraquinonesulfonate ion content was 14.2 mol %. The increase in the weight of the substrate was 24%. The solid electrolyte layer had an electric conductivity of 73 S/cm. The fluorine content was measured using an oxygen flask combustion method and ion chromatography in combination and found to be 0.5 mass %, revealing that about 1 mass % of fluororubber was contained in the polymer composition.

EXAMPLE 6

A capacitor device was obtained through the same processing as in Example 1 except that 3,4-ethylenedioxythiophene was replaced by a pyrrole solution having the same concentration and the oxidative polymerization temperature was changed to 5° C. in Example 1, and then evaluated in the same manner as in Example 1. The results obtained are shown in Tables 1 and 2.

The contents of sulfate ion and 2-anthraquinone-sulfonate ion in the polymer composition were determined by the method described in Example 1, as a result, the sulfate ion content was 1.7 mol % and the 2-anthraquinonesulfonate ion content was 15.9 mol %. The increase in the weight of the substrate was 21%. The solid electrolyte layer had an electric conductivity of 80 S/cm.

REFERENCE EXAMPLE 1

A capacitor device was manufactured under the same conditions as in Example 1 except that the 3,4-ethylenedioxythiophene was replaced by 4-methylthiophene. However, black blue poly-4-methylthiophene was not produced at all and the polymerization of 4-methylthiophene did not take place by the action of APS.

TABLE 1

Sparking Voltage (unit: V, n = 5)

| | Number of Total Times of Polymerization | | | | | | | |
|---|---|---|---|---|---|---|---|---|
| | 1 | 2 | 3 | 4 | 5 | 6 | 8 | 10 |
| Example 1 | 19 | 19 | 19 | 19 | 19 | 19 | 19 | 19 |
| Example 2 | 19 | 19 | 19 | 19 | 19 | 19 | 19 | 19 |
| Example 3 | 19 | 19 | 19 | 19 | 19 | 19 | 19 | 19 |
| Example 4 | 19 | 19 | 18 | 18 | 18 | 18 | 18 | 18 |
| Example 5 | 19 | 19 | 19 | 19 | 19 | 19 | 19 | 19 |
| Example 6 | 19 | 19 | 19 | 19 | 19 | 19 | 19 | 19 |
| Comparative Example 1 | 19 | 19 | 19 | 19 | 19 | 19 | 19 | 19 |

TABLE 2

| | Initial Properties | | | | | |
|---|---|---|---|---|---|---|
| | C µF | DF % | Z mΩ | LC µA | Number of Defective Samples/Total Number of Samples | Short Circuit |
| Example 1 | 8.0 | 0.6 | 60 | 0.03 | 0/30 | 0 |
| Example 2 | 8.0 | 0.6 | 60 | 0.03 | 0/30 | 0 |
| Example 3 | 8.0 | 0.6 | 60 | 0.02 | 0/30 | 0 |
| Example 4 | 7.2 | 0.8 | 60 | 0.05 | 0/30 | 0 |
| Example 5 | 7.8 | 0.7 | 60 | 0.02 | 0/30 | 0 |
| Example 6 | 7.8 | 0.6 | 60 | 0.03 | 0/30 | 0 |
| Comparative Example 1 | 8.0 | 0.6 | 60 | 0.06 | 0/30 | 0 |

In Examples 1–6, after the initial properties were measured, the capacitor device was exposed to high temperature and high humidity for 500 hours and then, the capacitance and the loss factor were again measured at 120 Hz. The results obtained are shown in Table 3. Furthermore, a capacitor device of Comparative Example 1 was prepared under the same conditions as in Example 1 except that polyester urethane rubber was not added, and measured in the same manner. The results are shown in Table 3. Table 3 apparently shows that the difference between the properties after the accelerated life test and the initial properties is extremely small in the capacitor device of Example 1 as compared with that of Comparative Example 1, thus, excellent effects were obtained.

As is demonstrated by these examples, according to the present invention, a high-performance capacitor having external stress-relaxing property and excellent life property can be obtained.

TABLE 3

| | Initial Properties | | Change in Properties after aging at 85° C., 85% RH and 13 V for 500 hours Rate of Change | |
|---|---|---|---|---|
| | Capacitance (μF) | Loss (%) | in Capacitance (%) | Loss (%) |
| Example 1 | 8.0 | 0.6 | 5.3 | 3.5 |
| Example 2 | 8.0 | 0.6 | 7.1 | 4.5 |
| Example 3 | 8.0 | 0.6 | 5.2 | 3.4 |
| Example 4 | 8.0 | 0.6 | 5.7 | 3.7 |
| Example 5 | 8.0 | 0.6 | 5.1 | 3.4 |
| Example 6 | 8.0 | 0.6 | 5.2 | 3.3 |
| Comparative Example 1 | 8.0 | 0.6 | 10.5 | 5.3 |

EXAMPLE 7
Preparation of Electrically Conducting Paste

The electrically conducting filler used was silver powder having an average particle size of 5.5 μm and the binder used was fluorocarbon rubber Viton (vinylidenefluoride-tetrafluoroethylene hexafluoropropylene copolymer). 85 mass % of silver powder and 15 mass % of Viton powder were mixed to form a solid content of the paste. To this mixture, butyl acetate as a solvent was added, and the mixture was kneaded to obtain a viscous silver past having a solid content of 60 mass %.

EXAMPLE 8
Manufacture of Solid Electrolytic Capacitor

An aluminum formed foil subjected to etching and then to anodic oxidation was slit into the width of 3 mm. Each slit was cut into 10 mm-long pieces. Each foil piece was subjected to electrochemical forming of the unformed area on the cut edge at a forming voltage of 13 V to form an oxide dielectric film over the entire surface of the aluminum foil. About 50% portion in the length direction of the formed foil was dipped in an ethyl alcohol solution of 3,4-dioxyethylenethiophene in a concentration of 1 mol/e, then dipped in an aqueous solution containing ammonium persulfate as an oxidizing agent (polymerization initiator) in a concentration of 1.5 mol/e and sodium naphthalene-2-sulfonate as a dopant in a concentration of 0.12 mol/e, and kept at 40° C. to allow the polymerization to proceed. This polymerization operation was repeated 20 times to form an electrically conducting polymer layer comprising poly(3,4-ethylenedioxythiophene) on the oxide film of the foil. After the polymerization repeated 20 times, the electrically conducting polymer layer having lamellae structure shown in FIG. 2 (in FIG. 2, the upper portion is the electrically conducting polymer layer having lamellae structure) was obtained. The area having this electrically conducting polymer layer was dipped in carbon paste and heat-treated at 100° C. for 30 minutes. The carbon paste used for forming the carbon paste layer was prepared by mixing 60 mass % of graphite powder having an average particle size of 3 μm and 40 mass % of the fluororubber used in Example 1 to form a solid content of the paste, adding thereto butyl acetate as a solvent and kneading the mixture. The carbon paste obtained was viscous and had a solid content of 16 mass %.

Subsequently, the area having the thus-formed carbon paste layer was dipped in silver paste prepared in Example 7 to form an electrically conducting layer, thereby fabricating one unit of capacitor element. The aluminum foil of this unit capacitor element on the side not having the electrically conducting polymer was cut. Four sheets of the unit elements were laminated, joined together with the same silver paste, connected to a lead frame (copper alloy) and dried at 100° C. for 3 hours. Thereafter, a lead frame (copper alloy) was welded to the aluminum foil not having thereon the electrically conducting polymer. Finally, the elements were all together sealed with epoxy resin (EME-7320A, produced by Sumitomo Bakelite Co., Ltd.) by the transfer molding while leaving one end part of each frame exposed to complete a chip-type capacitor. The properties of the capacitor obtained are shown in Table 4.

COMPARATIVE EXAMPLE 2

A chip-type solid electrolytic capacitor was manufactured in the same manner as in Example 8 except for changing the binder of silver paste to epoxy resin (Epikote 828, produced by YUKA SHELL EPOXY K. K.) in Example 8. The properties of the capacitor obtained are shown in Table 4.

TABLE 4

Performance of Capacitor Manufactured

| | ESR (mΩ) | Increase in ESR between Before and After Reflow (mΩ) | Reflow Defective Ratio | Humidity Defective Ratio |
|---|---|---|---|---|
| Example 8 | 20 | 2 | 0/30 | 0/30 |
| Comparative Example 2 | 25 | 20 | 6/30 | 12/30 |

In Table 4, ESR (equivalent series resistance at 100 kHz) is an average of 30 samples, and the reflow defective and the humidity defective (defective in moisture resistance) is a number of defective units out of 30 samples measured by the following methods.

Reflow Defective

Each capacitor was passed through a reflow furnace (230° C., 30 sec.), then a rated voltage (13 V) was applied and after 1 minutes, the leakage current value was measured. Samples having a leakage current of less than 12 μA were passed (non-defective unit) and samples of 12 μA or more were evaluated as a defective unit.

Humidity Defective

Each capacitor was allowed to stand in an atmosphere of temperature of 60° C./humidity of 90%. After 1,000 hours, the capacitor was taken out therefrom and a rated voltage was applied. Then, after 1 minute, a leakage current value was measured. Samples having a leakage current of less than 12 μA were passed (non-defective unit) and samples of 12 μA or more were evaluated as a defective unit.

EXAMPLE 9

A butyl acetate suspension of an ethylene/propylene/diene terpolymer (EPDM) (EPDM in the suspension: 7 mass %), serving as a binder resin, was added to an artificial graphite powder (UFG-5, product of SHOWA DENKO K. K.) (100 parts by mass) having an aspect ratio of 3-1.5 and an average particle size of 3 μm, and containing particles having a particle size of 32 μm or more in an amount of 2 mass % or less and a fixed carbon content of 99 mass %, which powder served as a conducting material. The suspension was added to the powder such that the solid resin content in the suspension was 80 mass % based on 100 parts by mass of the powder. Subsequently, the resultant mixture was stirred for 24 hours, to thereby prepare an electrically conducting carbon paste.

Electrochemically formed aluminum foil was cut to a size of 3 mm×10 mm, and a polyimide tape having a width of 1 mm was laterally affixed to the foil at a position 4 mm from an longitudinal end so that the tape surrounded both surfaces of the foil and divided each surface of the foil into two parts of 4 mm and 5 mm in length. A voltage of 13 V was applied to the portion of 3 mm×4 mm of the foil in a 10 mass % aqueous solution of ammonium adipate, and the portion was electrochemically formed. As a result, a dielectric oxide film was formed at that portion. Subsequently, the portion of 3 mm×4 mm of the foil was dipped into an isopropanol solution containing 3,4-dioxyethylene-thiophene (Baytron™ M, produced by Bayer AG) in an amount of 20 mass % (Solution 1) and removed from the solution, and air-dried at room temperature. Next, the portion on which the oxide film was formed was dipped into an aqueous solution containing ammonium persulfate in an amount of 30 mass % and sodium anthraquinone-2-sulfonate in an amount of 1 mass % (Solution 2) and removed, and allowed to stand at 60° C. for 10 minutes, to thereby carry out oxidation polymerization. Again, the portion was dipped into Solution 1 and subjected to the same treatment as described above. The procedure from dipping into Solution 1 to oxidation polymerization was performed 25 times. Thereafter, the portion was washed with hot water of 50° C. for 10 minutes, and dried at 100° C. for 30 minutes, to thereby form a conducting polymer layer (solid electrolyte layer).

The cross section of the aluminum foil having the thus-formed conducting polymer layer was checked by use of a scanning electron microscope photograph (2,000 power). As a result, it was confirmed that the conducting polymer layer forms a lamellar structure on the inner surfaces of micropores of a dielectric (alumina) on the aluminum foil so as to cover the surfaces, and that space portions exist between the lamellar structure of the polymer. The thickness of the conducting polymer layer structure formed on the outer surface of a micropore structure was approximately 5 $\mu$m, and the thickness of one layer which formed the lamellar structure was approximately 0.1–0.3 $\mu$m.

Subsequently, the above-prepared conducting carbon paste was applied to the conducting polymer layer portion formed on the aluminum foil, and heated at 100° C. for 30 minutes, to thereby form a conducting layer of the paste on the conducting polymer layer. A negative electrode lead terminal was connected to the conducting layer by use of a silver paste, and by means of welding a positive electrode lead terminal was connected to a portion at which a conducting polymer layer was not formed, to thereby obtain an element. The thus obtained element was sealed by use of an epoxy resin, and the element was subjected to aging at 125° C. for two hours by application of rated voltage, to thereby produce a capacitor. By means of the above procedure, 30 capacitors were produced.

Each of the thus-produced 30 capacitor elements was subjected to measurement of equivalent series resistance (ESR) by means of a customary method, and to reflow soldering treatment. After reflow soldering treatment, ESR of the element was measured again, and difference in ESR before and after reflow soldering treatment was estimated. Subsequently, all of the capacitor elements were tested for humidity defective ratio as described below. The results are shown in Table 5.

EXAMPLE 10

The procedure of Example 9 was repeated, except that a suspension of EPDM•butyl acetate as described in Example 9 was replaced by a suspension of a fluoropolymer (vinylidene fluoride-hexafluoropropylene-tetrafluoro-copolymer)•butyl acetate, and use of 80 parts by mass of the EPDM solid content with respect to 100 parts by mass of the artificial graphite powder was replaced by use of the fluoropolymer accounting for 70 mass % on the basis of 100 parts by mass of the artificial graphite powder, to thereby produce 30 capacitor elements. In the same manner as in Example 9, the thus-produced capacitor elements were evaluated for the above-described characteristics. The results are shown in Table 5, together with the results of Example 9.

COMPARATIVE EXAMPLE 3

The procedure of Example 9 was repeated, except that the artificial graphite powder as described in Example 9 and serving as a conducting material was replaced by flake natural graphite definitely having an aspect ratio of more than 10 and an average particle size of 4 $\mu$m, and containing particles having a particle size of 32 $\mu$m or more in an amount of 2 mass % or less and a fixed carbon content of 98.5 mass %, and that EPDM serving as a binder was replaced by an epoxy resin, to thereby produce 30 capacitors. The thus-produced capacitors were evaluated for the above-described characteristics. The results are also summarized in Table 5.

COMPARATIVE EXAMPLE 4

The procedure of Example 10 was repeated, except that the artificial graphite powder as described in Example 10 and serving as a conducting material was replaced by flake natural graphite definitely having an aspect ratio of 10 or more and an average particle size of 4 $\mu$m, and containing particles having a particle size of 32 $\mu$m or more in an amount of 2 mass % or less and a fixed carbon content of 98.5 mass %, to thereby produce 30 capacitors. The thus-obtained capacitors were evaluated for the above-described characteristics. The results are also summarized in Table 5.

In the above-described Examples 9–10 and Comparative Examples 3–4, evaluation tests were performed by the following methods and under the following conditions.

Measurement Method

1. Reflow Defective Ratio

Each of the produced 30 solid electrolytic capacitor s was passed through a reflow furnace at a peak temperature of 230° C. for 30 seconds. Subsequently, rated voltage (6.3 V) was imparted to the capacitor, and after one minute, leakage current was measured. When leakage current was less than 3 $\mu$A, the capacitor was considered to have passed.

2. Humidity Defective Ratio

The solid electrolytic capacitor s which passed the above reflow test were allowed to stand in an atmosphere: temperature 60° C., humidity 90%. After 1,000 hours, they were removed, and rated voltage (6.3 V) was imparted to each of the capacitors, and after one minute, leakage current was measured. When leakage current was less than 12 $\mu$A, the capacitor was considered to have passed.

TABLE 5

|  | ESR at 100 kHz (mΩ) | Difference in ESR Before and After Reflow Soldering (mΩ) | Reflow Defective Ratio*1 | Humidity Defective Ratio*1 |
|---|---|---|---|---|
| Example 9 | 20 | 5 | 0/30 | 2/30 |
| Example 10 | 20 | 0 | 0/30 | 0/30 |
| Comparative Example 3 | 50 | 50 | 5/30 | 12/25 |
| Comparative Example 4 | 40 | 20 | 2/30 | 3/28 |

*1 The number of failed capacitors/Total number of capacitors.

INDUSTRIAL APPLICABILITY

The present invention provides a solid electrolytic capacitor comprising a solid electrolyte layer and an electrically conducting layer containing metallic powder or an electrically conducting layer comprising an electrically conducting carbon layer and a layer formed thereon and comprising metallic powder in which at least one of said layers contains a rubber-like elastic material; a production method thereof; a solid electrolyte for use in the solid electrolytic capacitor; a production process of the solid electrolyte; an electrically conducting paste for use in the solid electrolytic capacitor and an electrically conducting carbon paste for use in the solid electrolytic capacitor.

The solid electrolytic capacitor of the present invention contains a rubber-like elastic material in an electrically conducting polymer composition which forms solid electrolyte. By containing the elastic material, the number of repeating times of dipping can be greatly reduced, the productivity can be improved, and a compact, low-impedance and high-performance solid electrolytic capacitor having external force-relaxing property and a production process thereof can be provided.

Furthermore, the solid electrolytic capacitor of the present invention comprises a solid electrolyte formed using a polymer of a specific 5-membered heterocyclic compound, particularly an electrically conducting polythiophene, as a π electron-conjugated polymer, so that effects are provided such that the voltage withstanding property (a sparking voltage test), high frequency property, tan δ, impedance property, leakage current, heat resistance (reflow property) and the like are greatly improved.

In particular, the above-described electrically conducting polymer composition has a content of one rubber-like elastic material of from about 0.01 to 25 mass % and a sulfate content of from about 0.1 to 10 mol %, based on the repeating unit of the polymer having a π electron-conjugated system, so that a solid electrolytic capacitor having capacitor properties of higher degree can be provided.

When the solid electrolytic capacitor of the present invention contains a rubber-like elastic material in an electrically conducting layer (i.e., an electrically conducting layer containing metallic powder or an electrically conducting layer comprising an electrically conducting carbon layer and an electrically conducting layer formed thereon and containing metallic powder), it has the following effects:

(1) the electrically conducting paste of the present invention uses a fluorocarbon rubber binder, therefore, has low elasticity, good heat resistance and high moisture resistance;

(2) the solid electrolytic capacitor using this electrically conducting paste in the electrically conducting layer is reduced in the thermal stress generated by the reflow and the like and is free from separation at the interface of the electrically conducting layer; and (3) as a result, the change in ESR between before and after the reflow is small and reflow failure or humidity defective does not occur.

Furthermore, the solid electrolytic capacitor of the present invention exhibits an excellent moisture resistance (water repellency) by using a rubber-like elastic material, particularly a fluoropolymer-based rubber-like elastic material in the electrically conducting carbon layer, and the use of a specific electrically conducting material (artificial graphite powder) in the electrically conducting carbon layer enables the packing density to be increased, thereby realizing excellent electric conductivity and heat resistance.

Therefore, a solid electrolytic capacitor making use of the conducting carbon paste exhibits excellent effects, including low ESR (equivalent series resistance at 100 kHz), small difference in ESR before and after reflow soldering, and low humidity defective ratio.

What is claimed is:

1. An electrically conducting carbon paste for solid electrolytic capacitors comprising an electrically conducting carbon material, a binder, and a solvent, wherein the conducting carbon material contains artificial graphite in an amount of 80 mass % or more, and the artificial graphite has a fixed carbon content of 97 mass % or more, has an average particle size of 1–13 μm, an aspect ratio of 10 or less, and contains particles having a particle size of 32 μm or more in an amount of 12 mass % or less, wherein the binder is a material of rubber-like elasticity which is swellable or suspendable in a solvent.

2. The electrically conducting carbon paste for solid electrolytic capacitors as claimed in claim 1, wherein the material of rubber-like elasticity is at least one species selected from the group consisting of isoprene rubber, butadiene rubber, styrene/butadiene rubber, nitrile rubber, butyl rubber, an ethylene/propylene copolymer, acrylate rubber, polysulfide rubber, a fluoropolymer, silicone rubber, and a thermoplastic elastomer.

3. The electrically conducting carbon paste for solid electrolytic capacitors as claimed in claim 2, wherein the conducting material accounts for 30–99 mass % and the binder accounts for 1–70 mass % of the entire solid content of the conducting carbon paste.

4. The electrically conducting carbon paste for solid electrolytic capacitors as claimed in claim 1 or 2, wherein the conducting material accounts for 30–99 mass % and the binder accounts for 1–70 mass % of the entire solid content of the conducting carbon paste.

5. The electrically conducting carbon paste for solid electrolytic capacitors as claimed in claim 1, wherein the conducting material accounts for 30–99 mass % and the binder accounts for 1–70 mass % of the entire solid content of the conducting carbon paste.

* * * * *